(12) United States Patent
Eden

(10) Patent No.: US 9,514,231 B2
(45) Date of Patent: *Dec. 6, 2016

(54) COMPUTER-BASED SYSTEM FOR USE IN PROVIDING ADVISORY SERVICES

(71) Applicant: Market76, Inc., New Haven, CT (US)

(72) Inventor: Ethan Eden, New Haven, CT (US)

(73) Assignee: MARKET76, INC., Stamford, CT (US)

( * ) Notice: Subject to any disclaimer, the term of this patent is extended or adjusted under 35 U.S.C. 154(b) by 321 days.

This patent is subject to a terminal disclaimer.

(21) Appl. No.: 14/156,492

(22) Filed: Jan. 16, 2014

(65) Prior Publication Data

US 2014/0201221 A1 Jul. 17, 2014

Related U.S. Application Data

(60) Provisional application No. 61/753,272, filed on Jan. 16, 2013.

(51) Int. Cl.
*G06F 17/30* (2006.01)
*G06Q 40/00* (2012.01)
*G06Q 30/02* (2012.01)
*G06Q 50/10* (2012.01)

(52) U.S. Cl.
CPC ......... *G06F 17/30867* (2013.01); *G06Q 30/02* (2013.01); *G06Q 40/00* (2013.01); *G06Q 50/10* (2013.01)

(58) Field of Classification Search
CPC .................. G06F 17/30867; G06F 17/30997; H04L 29/08072
USPC .......................................... 707/754; 709/203
See application file for complete search history.

(56) References Cited

U.S. PATENT DOCUMENTS

| | | | |
|---|---|---|---|
| 7,861,260 B2 * | 12/2010 | Shkedi | G06Q 30/0241 705/14.4 |
| 2004/0068490 A1 * | 4/2004 | Guibord | G06F 17/30864 707/769 |
| 2008/0259906 A1 * | 10/2008 | Shkedi | G06Q 30/0241 370/352 |

FOREIGN PATENT DOCUMENTS

WO    WO2006/052714 A2 *    5/2006    ........... G06Q 20/382

* cited by examiner

*Primary Examiner* — Shahid Alam
(74) *Attorney, Agent, or Firm* — Barnes & Thornburg LLP; Thomas J. McWilliams

(57) ABSTRACT

A computer-based system to facilitate providing advisory services to clients, comprising a networked server computer having a data accumulation engine that accepts user information, client information of clients of the users, and a plurality of user-defined tags. The data accumulation engine is operable to accumulate data regarding actions of the user and information associated with the user's clients in accordance with the clients' respective associated tags. The server also has a filtering engine that filters the data responsive to user requests; and a service engine for use in providing services targeted to clients based on the filtered data.

16 Claims, 20 Drawing Sheets

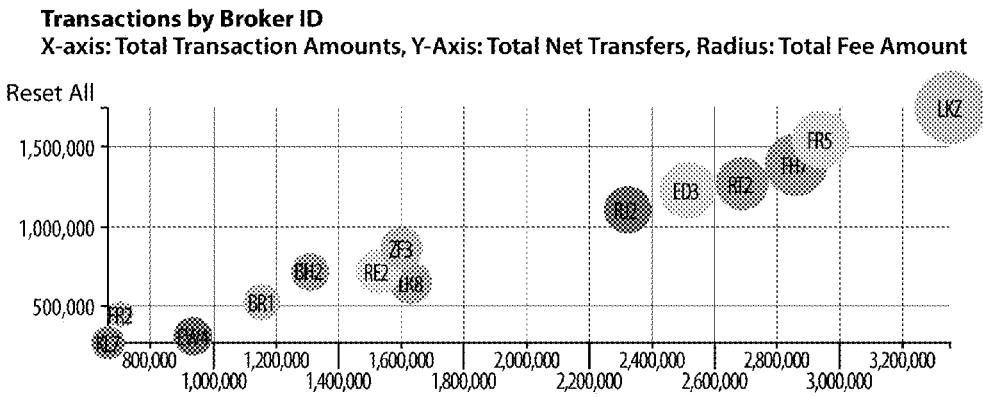

FIG. 6D

| Date | TX Type | Security | Units | Price | Total Amount | Fee Amount | Fee Type | Gain/Loss | Gain/Loss % | Net Flow | Data Source | Broker ID |
|---|---|---|---|---|---|---|---|---|---|---|---|---|
| 8/27/12 | | | | | | | | | | | | |
| 8/27/12 | Fee | n/a | n/a | n/a | -179 | -179 | 12-81 | n/a | n/a | n/a | National Financial | FR2 |
| 8/27/12 | Fee | n/a | n/a | n/a | -179 | -179 | 12-81 | n/a | n/a | n/a | National Financial | FR2 |
| 8/28/12 | | | | | | | | | | | | |
| 8/28/12 | Dividend | n/a | n/a | n/a | 31 | 0 | n/a | n/a | n/a | n/a | Pershing | FR5 |
| 8/28/12 | Transfer In | Cash and Cash Equivilents | 8011 | 1 | 8011 | 0 | n/a | 0 | 0.00% | 8011 | Pershing | ED3 |
| 8/28/12 | Sell | CMSCA | 286 | 44 | 12584 | 0 | n/a | 109.4808 | 0.87% | n/a | National Financial | ZF3 |
| 8/28/12 | Buy | VMED | 538 | 47 | 25285 | 0 | n/a | 1456.0022 | 5.77% | n/a | National Financial | ZF3 |
| 8/28/12 | Transfer In | Cash and Cash Equivilents | 119127 | 1 | 119127 | 0 | n/a | 0 | 0.00% | 119127 | National Financial | ZF3 |

FIG. 6E

Representative Brokerage Data Fields

| | | | |
|---|---|---|---|
| Transaction type | Investment objective transaction code | Fulfillment method | SMA datestamp |
| Account type code | Employer SIC | Tax ID type | SMA balance fed call for all account types |
| Registration type | Employer NAICS | State of origin | Margin buying power |
| Numbered account indicator | Statement review date | Account type | Technical short value |
| US resident indicator | Margin papers on file | Number of address | Total fed requirement |
| Married indicator | Option papers on file | First zip code | Total options requirement |
| Tenancy state | Good faith margin | Second zip code | Base currency |
| Joint tenancy clause | Inv professional discretion granted | Third zip code | Non USD currency trading eligible |
| Agreement execution date | Investment advisor discretion granted | Fourth zip code | SD net wort for all account types |
| Number of tenants | Third party discretion granted | Cost basis account system | Equity percent for all account types |
| State gift given | Risk factor code | Disposition method | Funds to trade |
| Date gift given | Investment objective de | Base currency | Portfolio margin house requirement |
| Age to terminate | Non us dollar trading | Income currency | Total house requirement for the account |
| Minors birthdate | Non customer indicator | Issue currency | TD liquidating equity percent |
| Manner of gift | Third party fee indicator | Statement language | Taxable indicator |
| Type of trust | Third party fee approval date | MSRB statement indicator | Put price |
| Date trust established | Commission schedule | Politically exposed person | Put date |
| Amended date | Prime broker free fund indicator | Political office held | Second premium call price |
| Trustee independent action | Fee based account indicator | Country of account level tax residency | Second premium call date |
| Date account opened | Equifax credit check indicator | USDE balance for all account types (%) | Called date |
| Date account info updated | Plain indicator | USD balance for all account types | Pool number |
| Account status indicator | Dicount indicator | USDE long market value | Factor |
| Pending Closed date | Fee blocking indicator 12b1 | USDE short market value | Factor date |
| Date account closed | Politically exposed person indicator | Liquidating equity for all account types | Previous factor |
| Account reactivated date | Foreign bank account indicator | USDE total balance for all account types | Previous factor date |
| Date account reopened | Initial source of funds | Total equity for all account types | Variable rate indicator |
| Mean tax lot (%) | USA patriot act exempt reason | TD net worth of account | Next or last coupon date |
| Mean trade (%) | Country of citizenship | Money market fund principal balance | Perpetual bond indicator |
| Number of confirmations | Country of residence | Money market fund dividend | Expanded first call price |
| Number of statements | Birth date | Cash available for all account types | Expanded first part call price |
| Expanded put price | Coupon rate | Dividend reinvestment eligibility indicator | Security symbol |
| Expanding second premium call price | Maturity date | Previous price date | Security type |
| Issuer of the security | Underlying CUSIP | Latest price date | Strike price |
| Issuing currency | First call price | End of month price date | Maturity date |
| Globally locked security indicator | First par call price | Record date | Contract size |
| Globally locked reason code | Primary symbol | Country code | Conversion ratio |
| Expanded bid price | Interest frequency | Bond sub class | State code |
| Expanded ask price | Bond class | Restriction indicator | Country code |
| Expanded previous day price | First coupon day | Trace indicator | Dividend option |
| Expanded latest price | Call indicator | New interest calculation code | Long term capital gains option |
| Expanded end of month price | Put indicator | Security SIC | Short term capital gains option |
| Contract share quantity | Next par call date | TD date stamp | Firm trading indicator |
| Sedol code | Prerefunded date | SD date stamp | Position currency |
| Isin code | Next premium call date | TD quantity | TD liquidating value |
| Issuer identifier | Dated date | SD quantity | Pool factor |
| Symbol of underlying security | First coupon | Transfer quantity | Exchange rate |
| Asset type | CNS eligible code | Pending transfer quantity | SD liquidating value |
| Asset subtype | DTC eligible code | Legal transfer quantity | Alternate security ID type |
| Asset sub subtype | NSCC eligible code | Tendered quantity | Alternate security |
| Payment day delays | Foreign security | Pending papers | Account number b |
| Exchange rate | Second coupon day | Short against the box quantity | Account type |
| Option root | Dividend interest payment method | Networked quantity | Fully paid lending quantity |
| Expiration date | Minor product code | Pending split quantity | Paid lending quat. collateral amt. |
| Call put indicator | ETF indicator | Covered quantity | Option root |
| Strike price | Bid price | TD quantity bought | Expiration date |
| CUSIP | Ask price | TD quantity sold | Call put indicator |
| Security type | Previous day price | Fed requirement | Strike price |
| Security modifier | Latest price | House margin requirement | TD repo quantity |
| Security calculation code | End of month price | NYSE requirement | SD repo quantity |
| Primary exchange | Round lot quantity | Equity requirement | TD reverse repo quantity |
| SD reverse repo quantity | SD repo liquidating value | CES collateral pledge liquidating value | SD reverse repo loan amount |
| Collateral pledge quantity | TD reverse repo liquidating value | TD repo loan amount | Accrued interest value |
| CES collateral pledge quantity | SD reverse repo liquidating value | SD repo loan amount | Coupon rate |
| TD repo liquidating value | Collateral pledge liquidating value | TD reverse repo loan amount | |

FIG. 7

Representative Acounting Relationship Data Fields

- Number of financial professionals
- Number of financial products
- Investment experience (years)
- Risk tolerance (1-100)
- beta (time series)
- standard deviation (time series)
- sharpe ratio
- Excess return
- Batting average
- Correlation
- R-squared
- Downside deviation
- Treynor ratio
- Sortino ratio
- Information ratio
- Tracking error
- delta
- gamma
- Reporting detail level
- Product breadth (number of types)
- Advisor age
- Advisor licenses
- Finacial professional relationships (#)
- Relationship types (accountant, atty, etc.)
- # of products
- AltEq: Convertibles Securities
- AltEq: Long/Short Funds
- Alternative
- Alternative: Absolute Return
- Alternative: Equity
- Alternative: International Equity
- Alternative: Structured
- AltFI: Absolute Return
- AltFI: Convertible Securities
- AltFI: Short Funds
- AltFI: Structured Products
- Annuity
- Bal: Conservative Allocation
- Bal: Moderate Allocation
- Bal: World Allocation
- Balanced
- Balanced: Global
- Cash & Equivalents
- Mutual Funds
- Any individual security
- Any basket of securities
- Asset flow (in/out)
- Effective expense rate

- Total 12b1 (% of value, time series)
- Total fees (% of value, time series)
- Total commissions (% of value, time series)
- Net long/short
- Transaction acceleration (time series)
- Advisor contact frequency
- Advisor meeting frequency
- Advisor call frequency
- Position size comfort level
- Service team membership (#)
- Total deposits (% of value, time series)
- Total withdrawals (% of value, time series)
- Transaction frequency
- Client tenure
- Houshold size (count)
- Number of household relationships
- Interest in increasing capital appreciation
- Interest in increasing dividends/interest
- Unrealized gain/loss (% of value)
- Unrealized s-t gain/loss (% of value)
- Unrealized l-t gain/loss (% of value)
- Total buys (% of value, time series)
- Total sells (% of value, time series)
- Expected rate of return
- Target rate of return
- Account count
- email provider
- LinkedIn indicator
- Facebook indicator
- Twitter indicator
- Google+ indicator
- Referral frequency
- Referral indicator
- Wallet share
- Advisor assistant indicaor
- Firm seniority indicator
- # Advisors
- % solely-managed accounts
- % of shared accounts
- mean advisors/account
- % of accounts supervised
- % of accounts supervisor
- % solely-managed assets
- % shared assets
- % assets supervised
- % assets supervisor
- Pipeline value / AUM
- Prospecting value / AUM

- Investment satisfaction
- Client perspective on portfolio risk
- Tax sensitivity
- Risk comfort
- Service concerns
- Income (individual)
- Income (household)
- Education (level)
- Education (institution)
- Equity: Global
- Equity: International
- Equity: International Core
- Equity: International Growth
- Equity: International Value
- Equity: Preferred
- Equity: US Large Core
- Equity: US Large Growth
- Equity: US Large Value
- Equity: US Mid Core
- Equity: US Mid Growth
- Equity: US Mid Value
- Equity: US Small Core
- Equity: US Small Growth
- Equity: US Small Value
- World stock
- Close rate % of leads (time series)
- Close rate % of assets (time series)
- Mean time to close lead
- Contact notes key words
- Position notes key words
- Transaction notes key words
- Email key words
- Rep disciplinary actions (count)
- Rep disciplinary actions (type)
- Rep disciplinary actions (date)
- States licensed (SEC)
- States licensed (FINRA)
- Firm type
- State or federal registration
- Rep employment history (# of firms)
- Rep employment history (firm names)
- Rep current firm tenure
- Rep mean firm tenure
- Firm AUM
- Rep % of firm AUM
- Firm jurisdiction licensing (FINRA)
- Firm jurisdiction licensing (SEC)
- Firm number of employees

- FI: Trust Preferred & Ex-Traded Debt
- Fixed Income
- Fixed Income: Corporate
- Fixed Income: Emerging Markets
- Fixed Income: Government
- Fixed Income: Govt/Corp
- Fixed Income: High Yield
- Fixed Income: Int'l
- Fixed Income: Multi-Sector
- Fixed Income: Municiple
- Fixed Income: TIPS
- Fixed Income: World Bond
- Alt: Asset Allocation
- Alt: Bank Loan Funds
- Alt: Commodity & Natural Resources
- Alt: Diversified Equity
- Alt: Financial Funds
- Alt: Health Funds
- Alt: High Yield Bond
- Alt: InflationProtected Secs.
- Alt: Master LPs
- Alt: Real Estate Funds
- Alt: REITs
- Alt: Technology Funds
- Alt: Utilities Funds
- Virtually any performance metric
- Gift value ($ over time series)
- Gift types
- Qualification value / AUM
- Value proposition / AUM
- Firm % of advisory function employees
- Firm % of B-D employees

FIG. 8

COMPUTER-BASED SYSTEM FOR USE IN PROVIDING ADVISORY SERVICES

CROSS-REFERENCE TO RELATED APPLICATION

This application claims priority to U.S. Provisional Application No. 61/753,272, entitled "Computer-Based System for Use in Providing Advisory Services" filed Jan. 16, 2013, the contents of which are hereby incorporated by reference as if set forth in their entirety.

FIELD OF THE INVENTION

The present invention is directed generally to providing and managing customized aggregated information and, more particularly, to systems and methods of providing vertical social networks for client oriented service providers.

BACKGROUND OF THE INVENTION

Historically, a company or an individual desiring to engage in information management, such as the management of client lists, appointments, client specific information and industry trends, for example, have had very few, if any, options available. The best option available was to create a complex filing system based on and keyed to a particular point of data, such as a client, and/or a tax identification number, for example.

However, whether such a system is kept electronically or otherwise, data thusly stored or accessible is often not uniformly maintained, is generally incomplete, and is often not linked by common features. For example, a client may be tracked by last name but may not be linked to a spouse having a different last name because the data is keyed solely to last name. Consequently, the information between these two clients may never be aggregated, and thus may not be readily substantially simultaneously reviewable.

The aforementioned issues may be particularly relevant in the financial sector. For example, poor information management in this sector may make client information, such as links between clients or different asset classes or accounts, not readily accessible.

Therefore, the need exists for information flow management that may be accessed from any communication device, that provides a central access point and data management point, and that improves information flow between users and clients, including third party users and potential client and/or contacts.

SUMMARY

A computer-based system to facilitate providing advisory services to clients, comprising a networked server computer having a data accumulation engine that accepts user information, client information of clients of the users, and a plurality of user-defined tags. The data accumulation engine is operable to accumulate data regarding actions of the user and information associated with the user's clients in accordance with the clients' respective associated tags. The server also has a filtering engine that filters the data responsive to user requests; and a service engine for use in providing services targeted to clients based on the filtered data.

In the present invention, the tags of the apparatus, system and method may include any of a plurality of data indicators that have a specialized meaning to a particular one or ones of the users. For example, the tags may comprise asset indicators, indicators of the clients, asset class indicators, indicators of a rating of at least one of the users, or the like.

Thus, the present invention provides an information flow management that may be accessed from any communication device, that provides a central access point and data management point, and that improves information flow between users and clients, including third party users and potential client and/or contacts. The present invention further provides a collaborative network which may facilitate the categorization and/or standardization/normalization of data between users.

It is to be understood that both the foregoing general description and the following detailed description are exemplary and explanatory, and are intended to provide further explanation of the invention as discussed herein throughout.

BRIEF DESCRIPTION OF THE DRAWINGS

The accompanying drawings are included to provide a further understanding of the disclosed embodiments. In the drawings:

FIGS. 6A-6E illustrate aspects of an exemplary graphical user interface in accordance with the herein described systems and methods;

FIGS. 7 and 8 are abbreviated lists of exemplary data that may be handled in accordance with the herein described systems and methods;

DETAILED DESCRIPTION

Figure 1A:
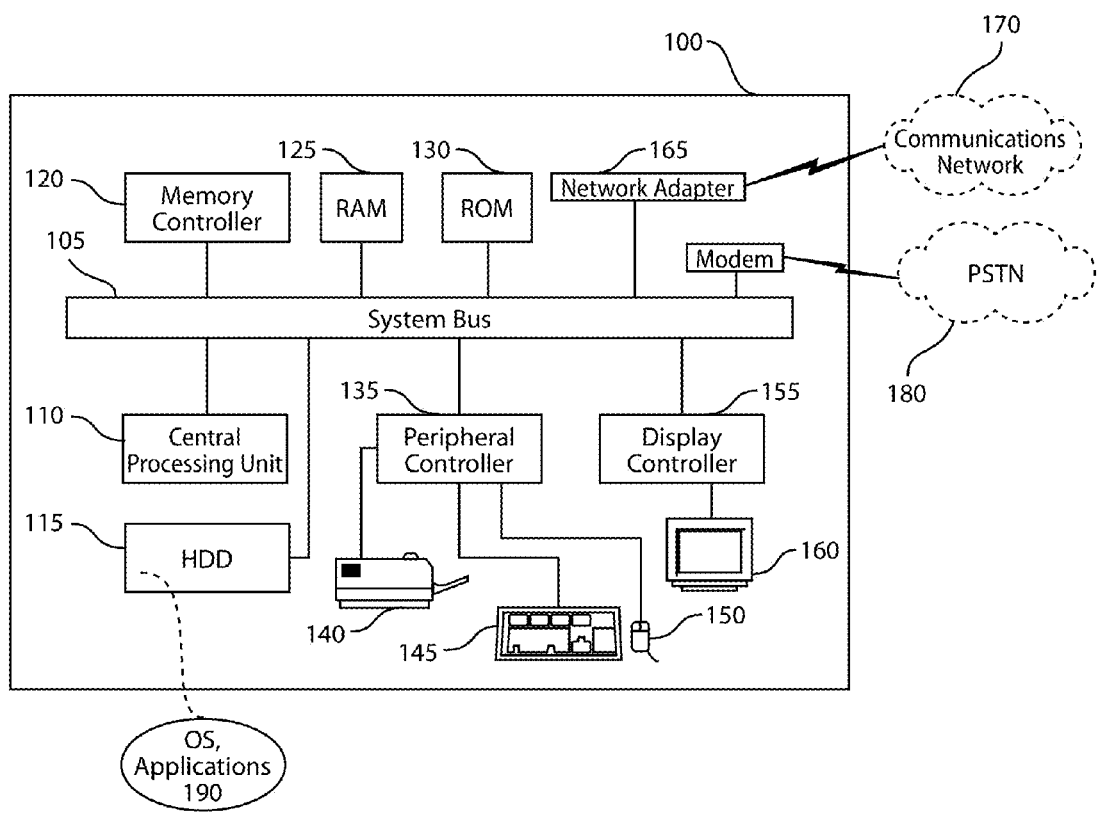
FIGS. 1A and 1B are block diagrams of exemplary computing systems and networks that may be used in accordance with herein described systems and methods.

A computer-implemented platform and methods of use are disclosed that provide networked access to a plurality of types of digital content, including but not limited to video, audio, data and document content, and that track and deliver the accessed content to one or more users. Described embodiments are intended to be exemplary and not limiting. As such, it is contemplated that the herein described systems and methods can be adapted to provide many types of users with access and delivery of many types of data, and can be extended to provide enhancements and/or additions to the exemplary services described. Reference will now be made in detail to various exemplary and illustrative embodiments of the present invention.

The present invention may provide an organization system for user entered data, may automatically augment entered data based on user preferences and/or community treatment of similar data points, and may act as a data scrubber for eliminating non-public personal information (NPI) related data and a central storage facility for information which may be entered and/or automatically collected by the present invention. In an aspect of the present invention, a vertical social network for certain professionals, such as those in the financial field for example, is provided to allow for associations to be made and communications to occur between those professionals and other professionals, services, clients, potential clients, and service-related information. As used herein, exemplary reference to such professionals, "advisors," "financial advisors," and like terms includes reference to service providers within financial and related industries, including all levels of advisors, administrators and marketers in the financial service industry, the insurance industry, the banking industry, the investment industry, and the like. However, the invention is not so limited, and may be applied to any field.

For example, in the financial field, a financial advisor, whether an independent or part of a larger organization may have a subset of existing clients, service providers, and information sources. Challenges faced by such a financial advisor include the organization of clients and the information directly related to each client, such as, for example, the client's current investment portfolio handled by the advisor, the scheduling of interactions with clients, the handling of information from a variety of sources, and the accessing of such information in a timely and efficient manner. Such challenges are in addition to the expansion of numbers of clientele and like information necessary for the success of a financial advisor such as, for example, the growth of client assets, the understanding of the totality of a client's investments and net worth, information and services which may be most valuable to certain clients, and information related to clients and/or investments which may be used to formulate and/or optimize an investment strategy. For example, the present invention may allow for the efficient allotment of information related to only a small subset of existing clients and may facilitate securities underwriting through the connection of service providers and financial professional based on, in part, the characteristics of existing clients, for example.

In an embodiment of the present invention, data and information related to the provision of such financial and financial-related services, such as data and information regarding high net worth individuals, may be collected and aggregated. As used herein, high net worth individuals include those persons who individually or collectively have an annual income over $100,000 and/or holdings having an estimated value of between about $100,000 and $1,000,000+. Such data may be related to both existing and potential clients and may be aggregated to show commonalities and connections between such clients, client asset classes, and other third parties, including other financial advisors and service providers, for example.

Data which may be collected and/or entered into the system may include, for example, client information, industry information, service provider information, news and current events, and related rules and regulations. Client information may include, but is not limited to, name, address, telephone number, email and other contact information, employment, business associations, board memberships, organization affiliations and/or memberships, family relationships, social network participation and related ID, income, debt instruments, asset valuation (s), options, investments, investment income, business ownership(s), current investment portfolio, annual investment commitment(s), service providers used, religion/faith, gender, nationality, investment/bank account particulars (including passwords and security information), birth date, and other personal information, such as asset and risk preference information, which may be unique to the client. As described herein, such data may be aggregated per an individual advisor, and/or may be anonymously shared by and between financial advisors to more efficiently and effectively serve a client's needs or to expand the number of clients served through the actions of the financial advisor, subject to the advisor's regulatory requirements and/or privacy policies, for example.

In an embodiment of the present invention, as discussed herein, the present invention may allow for the automation of client scheduling based on the specific scheduling needs of a highly heterogeneous group of clients, and for the preparation for interactions with such a group. Further, as is discussed herein in greater detail, the present invention may provide for the organization and normalization of similar information about participating advisors and service providers, which may further allow for the filtering of aggregated information.

FIG. 1A depicts an exemplary computing system 100 that may be employed in accordance with the herein described system and methods. Computing system 100 is capable of executing software, such as an operating system (OS) and a variety of computing applications 190, such as an application in accordance with the herein described methodologies. The operation of exemplary computing system 100 is controlled primarily by computer readable instructions, such as instructions stored in a computer readable storage medium, such as hard disk drive (HDD) 115, optical disk (not shown) such as a CD or DVD, solid state drive (not shown) such as a USB "thumb drive," or the like. Such instructions may be executed within central processing unit (CPU) 110 to cause computing system 100 to perform operations. In many known computer servers, workstations, personal computers, mobile devices, and the like, CPU 110 is implemented in an integrated circuit called a processor.

It is appreciated that, although exemplary computing system 100 is shown to comprise a single CPU 110, such description is merely illustrative as computing system 100 may comprise a plurality of CPUs 110. Additionally, computing system 100 may exploit the resources of remote CPUs (not shown), such as, for example, third party information suppliers, through communications network 170 or some other data communications means.

In operation, CPU 110 fetches, decodes, and executes instructions from a computer readable storage medium, such as HDD 115. Such instructions can be included in software such as an operating system (OS), executable programs, and the like. Information, such as computer instructions and other computer readable data, is transferred between components of computing system 100 via the system's main data-transfer path. The main data-transfer path may use a system bus architecture 105, although other computer architectures (not shown) can be used, such as architectures using serializers and deserializers and crossbar switches to communicate data between devices over serial communication paths. System bus 105 can include data lines for sending data, address lines for sending addresses, and control lines for sending interrupts and for operating the system bus. Some busses provide bus arbitration that regulates access to the bus by extension cards, controllers, and CPU 110. Devices that attach to the busses and arbitrate access to the bus are called bus masters. Bus master support also allows multiprocessor configurations of the busses to be created by the addition of bus master adapters containing processors and support chips.

Memory devices coupled to system bus 105 can include random access memory (RAM) 125 and read only memory (ROM) 130. Such memories include circuitry that allows information to be stored and retrieved. ROMs 130 generally contain stored data that cannot be modified. Data stored in RAM 125 can be read or changed by CPU 110 or other hardware devices. Access to RAM 125 and/or ROM 130 may be controlled by memory controller 120. Memory controller 120 may provide an address translation function that translates virtual addresses into physical addresses as instructions are executed. Memory controller 120 may also provide a memory protection function that isolates processes within the system and isolates system processes from user processes. Thus, a program running in user mode can normally access only memory mapped by its own process virtual address space; it cannot access memory within another process' virtual address space unless memory sharing between the processes has been set up.

In addition, computing system 100 may contain peripheral controller 135 responsible for communicating instructions using a peripheral bus from CPU 110 to peripherals, such as printer 140, keyboard 145, and mouse 150. An example of a peripheral bus is the Peripheral Component Interconnect (PCI) bus.

Display 160, which is controlled by display controller 155, can be used to display visual output generated by computing system 100. Such visual output may include text, graphics, animated graphics, and/or video, for example. Display 160 may be implemented with a CRT-based video display, an LCD-based display, gas plasma-based display, touch-panel, or the like. Display controller 155 includes electronic components required to generate a video signal that is sent to display 160.

Further, computing system 100 may contain network adapter 165 which may be used to couple computing system 100 to an external communication network 170, which may include or provide access to the Internet. Communications network 170 may provide user access to computing system 100 with means of communicating and transferring software and information electronically, and may be coupled directly to computing system 100, or indirectly to computing system 100, such as via PSTN or cellular network 180. For example, users may communicate with computing system 100 using communication means such as email, direct data connection, virtual private network (VPN), or the like. Additionally, communications network 170 may provide for distributed processing, which involves several computers and the sharing of workloads or cooperative efforts in performing a task. It is appreciated that the network connections shown are exemplary and other means of establishing communications links between computing system 100 and remote users may be used.

It is appreciated that exemplary computing system 100 is merely illustrative of a computing environment in which the herein described systems and methods may operate and does not limit the implementation of the herein described systems and methods in computing environments having differing components and configurations, as the inventive concepts described herein may be implemented in various computing environments using various components and configurations.

Figure 1B:
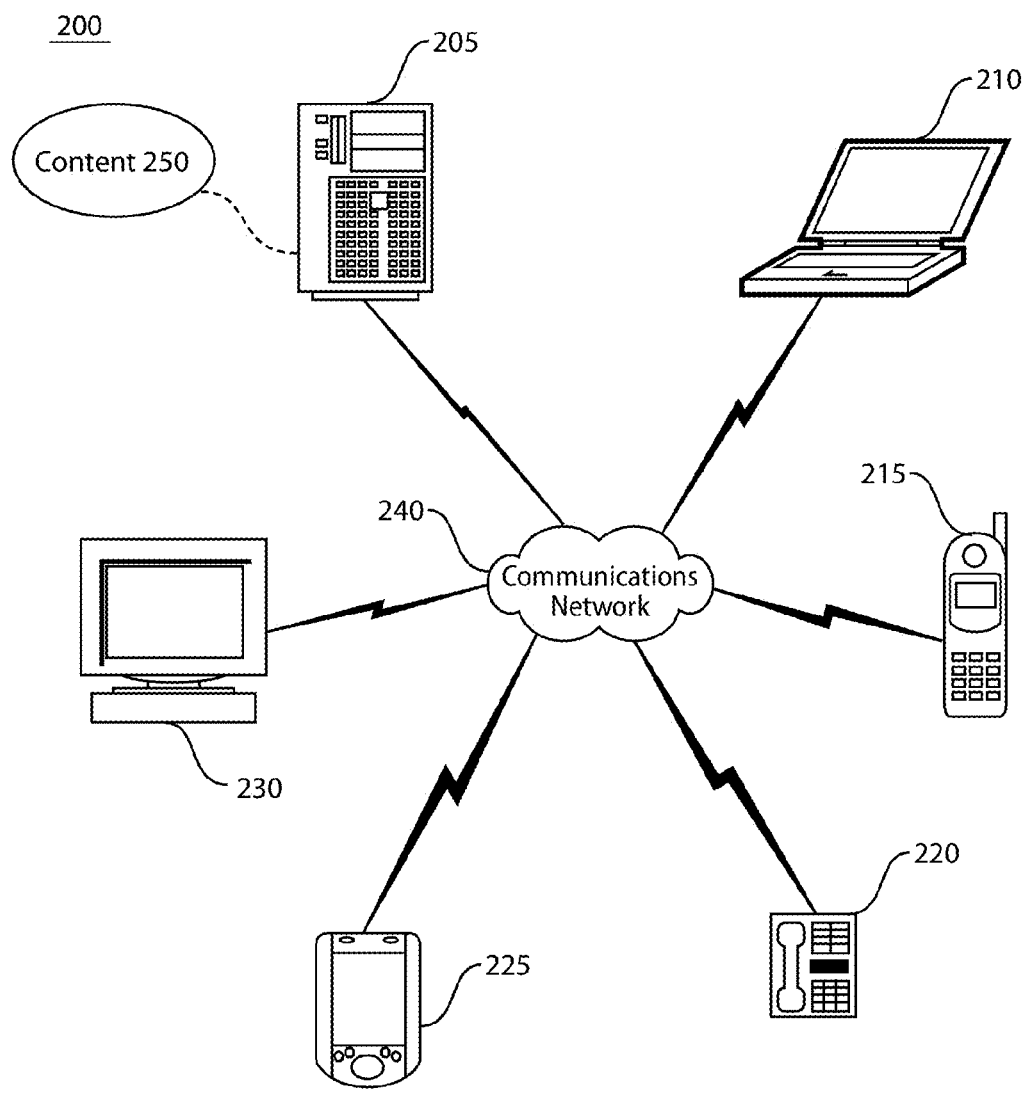

As shown in FIG. 1B, computing system 100 may be deployed in networked computing environment 200. In general, the above description for computing system 100 applies to server, client, and peer computers deployed in a networked environment, for example, server 205, laptop computer 210, and desktop computer 230. FIG. 1B illustrates an exemplary illustrative networked computing environment 200, with a server in communication with client computing and/or communicating devices via a communications network, in which the herein described apparatus and methods may be employed.

As shown in FIG. 1B, server 205 may be interconnected via a communications network 240 (which may include any of, or any combination of, a fixed-wire or wireless LAN, WAN, intranet, extranet, peer-to-peer network, virtual private network, the Internet, or other communications network such as POTS, ISDN, VoIP, PSTN, etc.) with a number of client computing/communication devices such as laptop computer 210, wireless mobile telephone 215, wired telephone 220, personal digital assistant 225, user desktop computer 230, and/or other communication enabled devices (not shown). Server 205 can comprise dedicated servers operable to process and communicate data such as digital content 250 to and from client devices 210, 215, 220, 225, 230, etc. using any of a number of known protocols, such as hypertext transfer protocol (HTTP), file transfer protocol (FTP), simple object access protocol (SOAP), wireless application protocol (WAP), or the like. Additionally, networked computing environment 200 can utilize various data security protocols such as secured socket layer (SSL), pretty good privacy (PGP), virtual private network (VPN) security, or the like. Each client device 210, 215, 220, 225, 230, etc. can be equipped with an operating system operable to support one or more computing and/or communication applications, such as a web browser (not shown), email (not shown), or independently developed applications, the like, to interact with server 205.

The server 205 may thus deliver applications specifically designed for mobile client devices, such as, for example, client device 225. A client device 225 may be any mobile telephone, PDA, tablet or smart phone and may have any device compatible operating system. Such operating systems may include, for example, Symbian, RIM Blackberry OS, Android, Apple iOS, Windows Phone, Palm webOS, Maemo, bada, MeeGo, Brew OS, and Linux for smartphones and tablets. Although many mobile operating systems may be programmed in C++, some may be programmed in Java and .NET, for example. Some operating systems may or may not allow for the use of a proxy server and some may or may not have on-device encryption. Of course, because many of the aforementioned operating systems are proprietary, in prior art embodiments server 205 delivered to client device 225 only those applications and that content applicable to the operating system and platform communication relevant to that client device 225 type.

The present invention may allow for the customized organization of information located within the networked computing system discussed with respect to FIGS. 1A and 1B, such as through tagging, for example. Tagging may include the attachment of significance, a unique nomenclature system, and/or a particular value, to at least one piece of information and/or asset within the present invention. Tags may be created by each user of the system and may be particularly suited to the clients held by the creating user. As used herein, a "user" is anyone who uses the system to view and/or interact with data other than non-public personal information (NPI), and can include an advisor or the like who directly engages in data entry or data review in relation to the herein described systems and methods, including, for example, tech firms and asset managers. As used herein, a "client" is used to refer to anyone who uses the system to view and/or interact with data that is non-public personal information (NPI) wherein the client him/herself is the subject of the NPI. Thus, the terms "user" and "client" pertain not only to the person but to the way the person is interacting with the system, and a person can be either a user or a client, depending on how he/she is interacting with the system at a given time.

A user may utilize or modify predefined tags provided in the system or developed by other users, and/or may create new tags. Any desired combination of tags and their usage is available to the user, such as the use of tags created by the individual user, tags created by those users with whom that user is associated, tags created within or by an entity, or all global tags. Each piece of information and/or asset may have more than one tag associated with it. As such, data associated with the tags may be operated upon in any manner known to those of skill in the art. For example, data may be accumulated, filtered, modified, and/or analyzed in any desired manner. In addition, data may be associated through the use of tags, key fields, pointers, and the like, to other data; and the data thus associated may also be operated upon.

The operated upon data may kept solely by the user who performed the operation, such as by storing in a locally accessible location, or a secured network address; or may be shared with others, such as by storing in a network location accessible by others. Preferably, sharable data is scrubbed of NPI and rendered in a neutral format before being made available to others. The others may then perform operations such as filtering and analysis on the neutral data. This allows all participants in an information chain to make available the substance of private data that cannot be shared otherwise without abrogating the privacy of the subjects of the information.

Figure 2A:
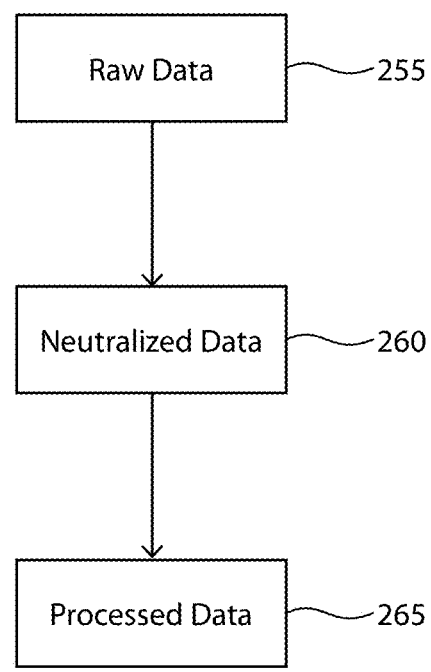
FIGS. 2A and 2B are block diagrams illustrating the gathering and handling of data in accordance with herein described systems and methods.

FIG. 2A is a flow diagram of an exemplary data handling operation. Raw data is entered into the system, 255. The data may be entered by the subject of the data him/herself, or by a user that interacts directly with the subject, for example, wherein the subject is a client of the user. Preferably, the subject (client) may be responsible for monitoring and curating the NPI that is stored in the system, for example, by ensuring that it is correct, updated, appropriate for use in the system, or the like. Accordingly, in embodiments the clients may have full rights to their NPI, which is stored securely and protected in accordance with any applicable statutory and/or regulatory requirements, such as the Statements on Standards for Attestation Engagements No. 16 (SSAE 16) for financial information, Health Insurance Portability and Accountability Act of 1996 (HIPAA) for health information, etc.

In an exemplary operation, the data entered into or gathered by the system is scrubbed of NPI and rendered neutral, 260. Neutral data may be stored in a location accessible to all users of the system, or a select subset of users. The users who have access to the neutral data can then process the data by performing any desired operations on the data, 265. Alternatively, a user may choose to make a copy of select data and process the copy. In embodiments, the results of processing the data can be stored on the system and made available to other users.

Figure 2B:
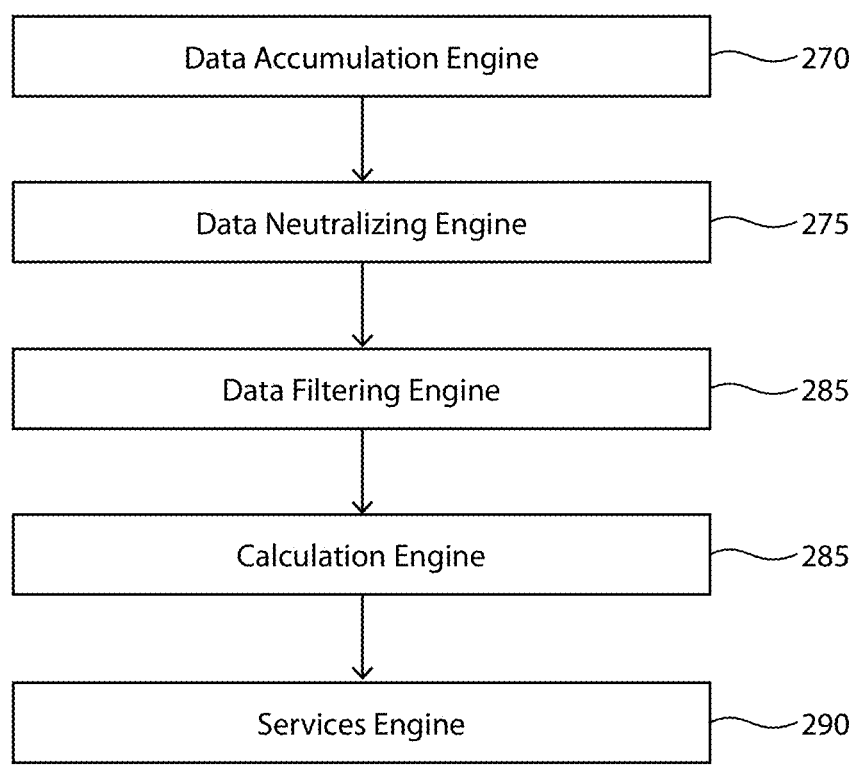

FIG. 2B illustrates a system for handling data in accordance with the present disclosure. A data accumulation engine, 270, accumulates data for use by users. Accumulating data may include crawling the Internet and/or other sources of information, such as a market ordering system for example. Virtually any aspect of any subject may be obtained and stored by the accumulation engine. For example, in the financial services sector, FIGS. 7 and 8 are abbreviated lists of data that may be gathered by the accumulation engine 270. The invention is not so limited, however, as additional or other data may also be gathered or developed.

After data is accumulated, it may be neutralized by removing or securing any non-public personal information therein by a data neutralizing engine, 275. The neutralizing engine may programmatically and automatically neutralize gathered data, or may neutralize data under the control of a user. The neutral data may then be filtered by data filtering engine, 280, and may be operated on by calculation engine 285. The filtering and/or calculation engines may programmatically and automatically filter and perform calculations on the neutralized data, or may do so under the control of a user.

The results of the filtering and/or calculating may then be used by users for any desired purpose. For example, various analyses may be performed on neutralized data to tease out characteristics of a desired target audience of advertising, for use in honing the advertising to make it more effective for that audience, and/or to identify a more appropriate audience, and/or to identify more effective advertising placement options, for example. Similarly, the results may be used as input to services engine 290 to enhance a service provider's offerings. For example, a stock broker may use the services engine 290 to keep clients updated regarding the value of their holdings, or the performance of their holdings compared to other available investments, etc.

Figure 6A:
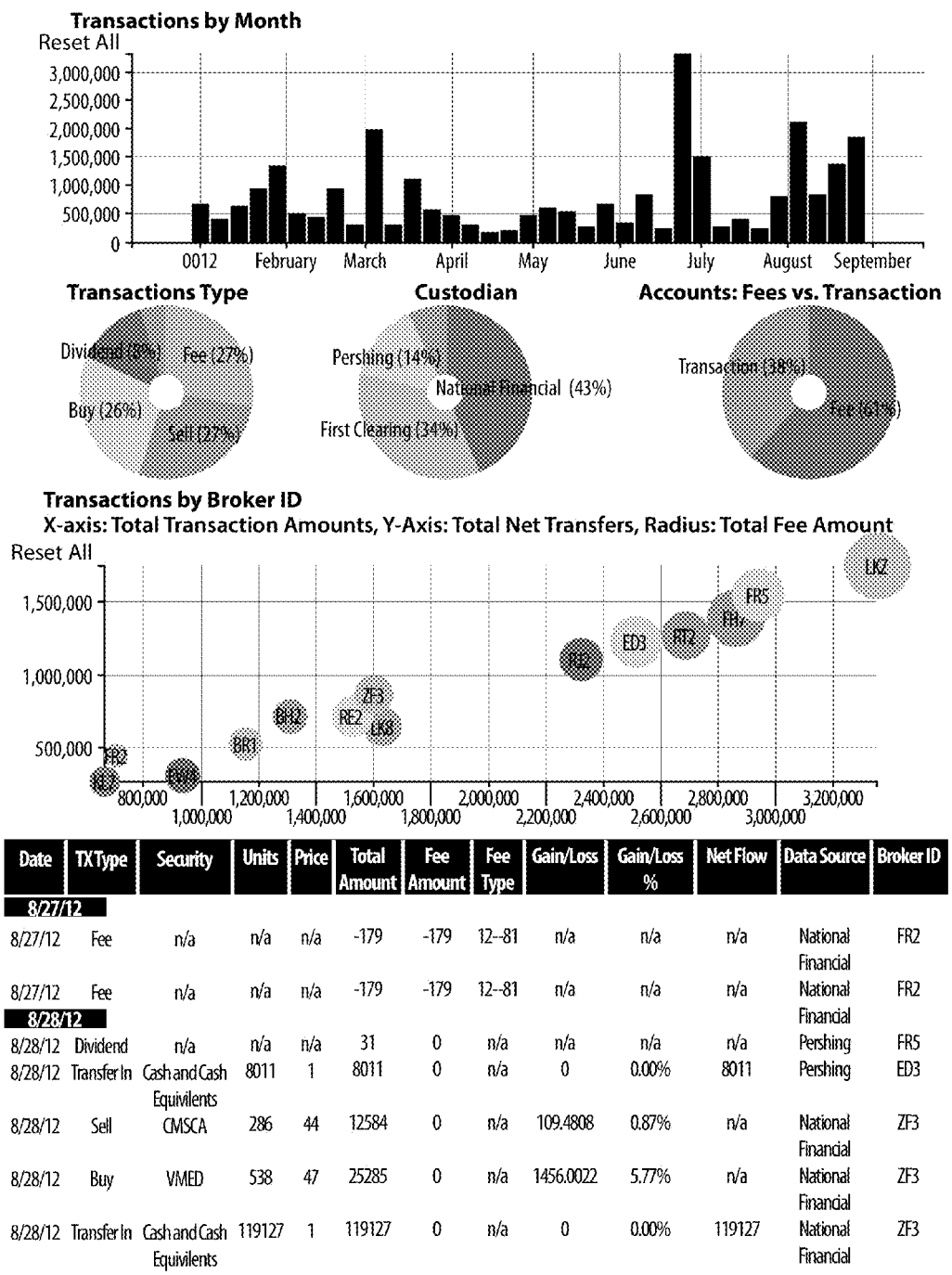
Figure 6B:
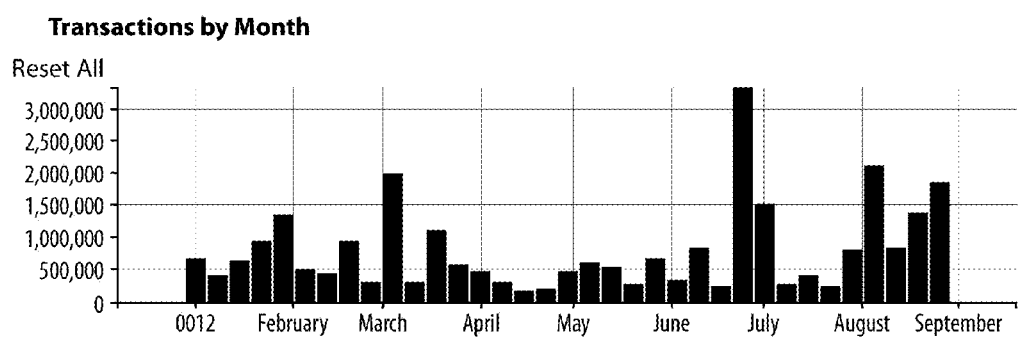

For example, service engine 290 can be configured to provide an interface that streamlines the gathering and presentation of investment information for a stock broker. FIGS. 6A-6E show such an exemplary presentation. FIG. 6A shows an exemplary arrangement of a plurality of data presentation elements, shown in greater detail in FIGS. 6B-6E. FIG. 6B is a bar chart showing monthly transactions. Such a chart may be useful to display the transactions of a particular client or group of clients, or of a particular broker or brokerage, etc. The axes may be configured to automatically or manually adapt the ranges displayed as appropriate for the data represented.

Figure 6C:
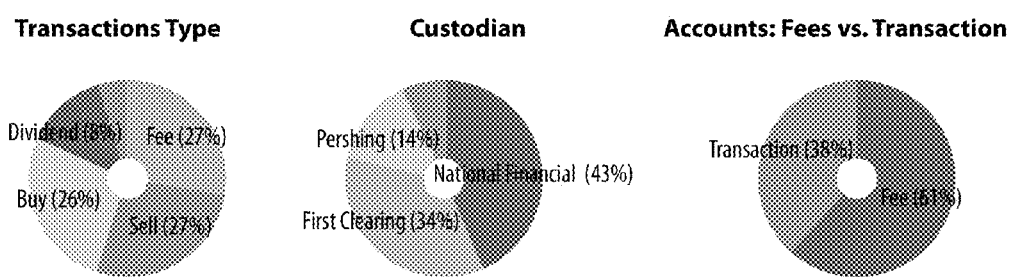

FIG. 6C shows a series of pie charts showing transaction types, custodians, and Fees vs. Transactions, respectively. FIG. 6D is a scatter diagram showing Transactions by Broker ID. FIG. 6E shows records of individual holdings.

The invention is not limited to the display elements shown in FIG. 6A. Rather, any desired type of display element may be developed, showing any desired type of filtered and/or calculated data. In embodiments, once the filters/calculations and presentation elements are set up, the results can be updated continuously, periodically, or responsively to a request.

Figure 3A:
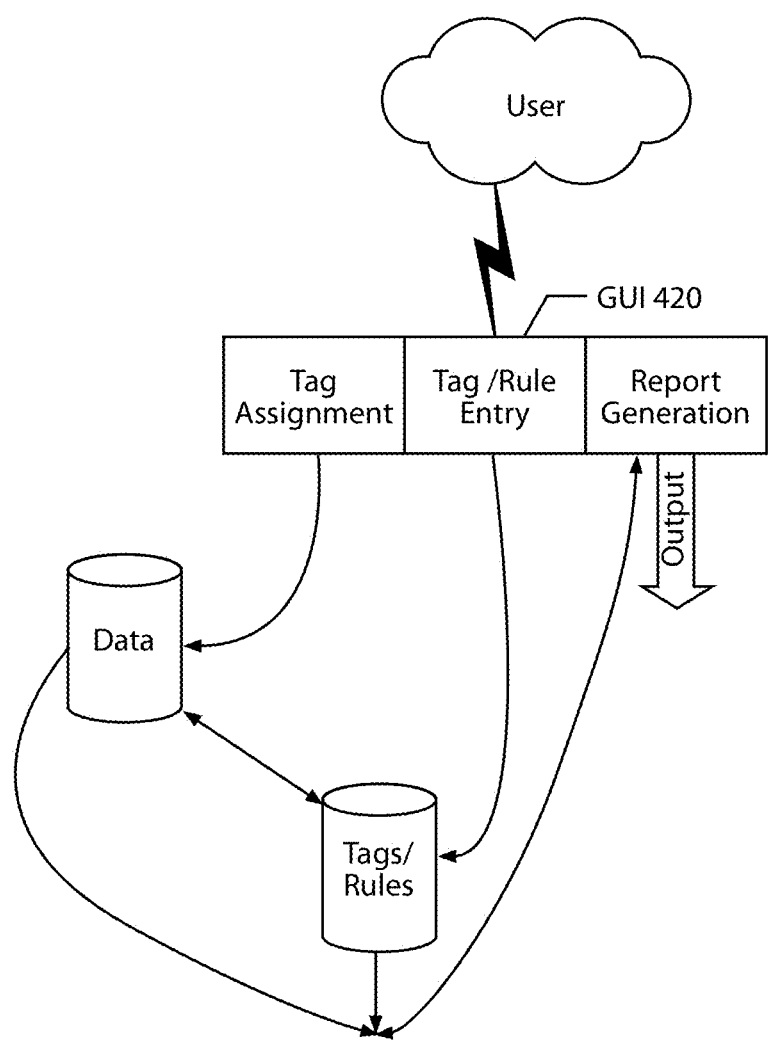
FIGS. 3A, 3B, and 3C illustrate organizational aspects of the present invention.
Figure 3B:
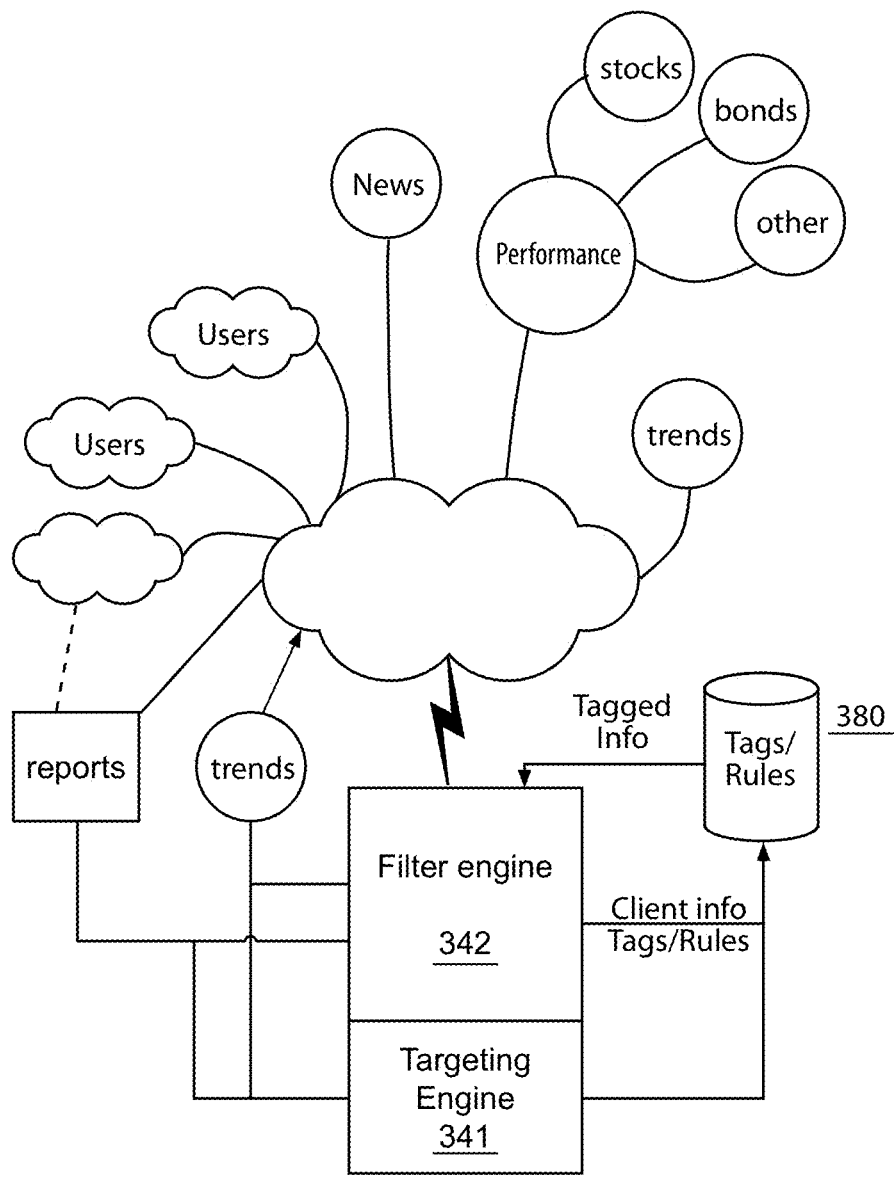
Figure 3C:
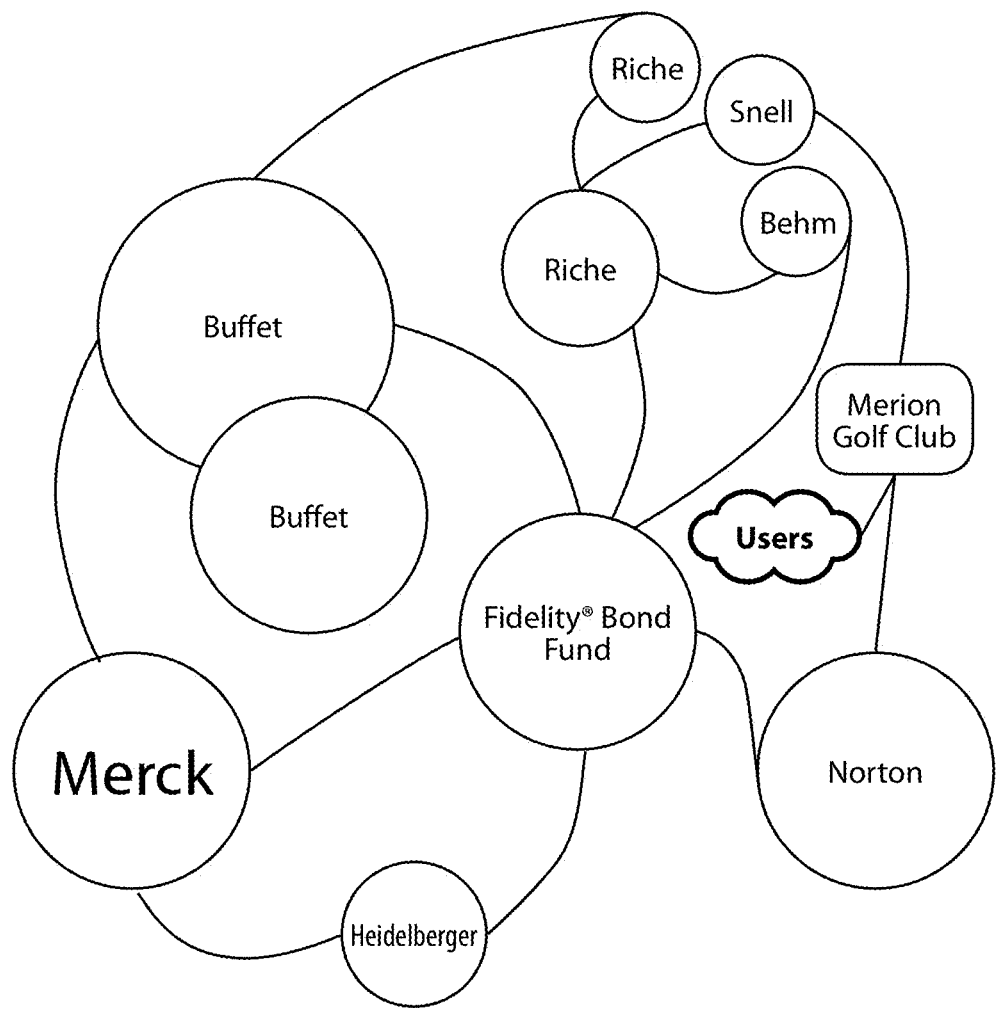

In an embodiment of the present invention illustrated in FIG. 3A, each piece of information/data contained within the system has at least one tag. FIGS. 3A-3C may, in certain embodiments, be interoperable within the computing system discussed herein with respect to FIGS. 1A and 1B. For example, at least one client or potential client may be associated with at least one tag. Similarly, each asset and asset class that may possibly reside in each account/client/ household may have a particular tag or tags. Tags may also be associated with specific items, such as, for example, calls, meetings, work tasks, and the like, as well as products and people related to the financial industry, for example, such as wholesalers, portfolio managers, and the like. Allowing for custom tags may provide a greater degree of flexibility when aggregating filtered or global information and may allow for user-defined and/or influenced methodologies for describing, for instance, risk tolerance, investment strategy, advisor or client perceptions, and success metrics, for example. Similarly, tags created by third parties may more accurately describe and/or characterize the tagged information and may provide for a more universally useful data set such that a comparison may be made between universal tags, a user's tags, and even a specific sub-set of users' tags, for example, to yield otherwise unknown information for use by an advisor, client, and/or marketer.

In addition to facilitating the building of discrete data sets, tagging may allow for more flexible management of a diverse client base within the context of a database, such as that illustrated in FIG. 3A. For example, traditional relational data models may force advisors to "tag" clients, accounts, prospects, asset classes, and the like using only predetermined tags and/or tag classes, regardless of whether the available tags/classes fully encompass and/or properly characterize the data being tagged. This type of tagging may leave a portion of the available information not classified or misclassified. Such limited tagging may magnify errors or inefficiencies when applying either analytics or strategies to tagged data. Absent the ability to create custom tags, the user is left to greatly simplify any characterization of assets which, historically, has meant classifying into just one to four asset allocations. The present invention may, however, allow for an unlimited set of permutations—such as a unique bucket for each client—defined by a plurality of predetermined and/or user-definable tags, which may allow for a much greater degree of automation across a disparate client base.

For example, a tag may be created by a user of the system to denote the volume of investments made by client(s) and may be delineated by monetary steps, such as a tag denoting a level of investment under $20,000, between $20,001 and $100,000, between $100,001 and $350,000, and in excess of $350,001, for example. As can be appreciated by those skilled in the art, such tags may take any form, and may for example, be created as "<20k", "20k< >100k", "100k< >350", and ">350k", respectively. Tagging in this customized manner may increase objectivity by allowing the user to set investment spreads in line with existing clients and to provide a better distribution of the existing clients across the created tags. Tagging may also indicate the sophistication and/or qualification of an investor client and may allow for an indication of the client's asset level without having the full value of the client's assets known to any one user of the system.

Similarly, a tag may be created to denote and/or differentiate various asset classes such as, for example cash and cash equivalents, such as certificate of deposit or money market funds; fixed interest securities, such as bonds: investment-grade or junk (high-yield); government or corporate; short-term, intermediate, long-term; domestic, foreign, emerging markets; convertible security; stocks, which may be sub-tagged as value, dividend, growth, sector specific or preferred (or a "blend" of any two or more of the preceding); large-cap versus mid-cap, small-cap or micro-cap; public equities versus private equities; domestic, foreign (developed), emerging or frontier markets; commercial or residential real estate investment funds; natural resources, such as agriculture, forestry and livestock, energy or oil and gas distribution, carbon or water; precious metals; industrial metals and infrastructure; collectibles, such as art, coins, or stamps; insurance products, such as annuity, life settlements, catastrophe bonds, personal life insurance products, and the like; derivatives, such as long-short or market neutral strategies, options, collateralized debt and futures; foreign currency; and venture capital in the form of leveraged buyout, merger arbitrage or distressed securities, for example. Such tags may allow a user to compare products and the value thereof against similarly disposed tags created and/or qualified by another user. Thus, a first user may benefit from using a tag created by a second or other user with particular insight/expertise not otherwise held by the first user.

In addition to these assets classes, customized tags may further refine and/or characterize these assets as related to particular clients. For example, one or more of a user's clients may hold a collateralized debt instrument associated with the same source. Such a tag may allow the user to track who is invested in particular vehicles and how much money of not only the individual investor, but of all the clients under the control of the advisor, who are vested in the particular instrument and to what degree. Thus, the user may run a filter and/or aggregate the assigned tags to obtain a discrete understanding of how the particular investment impacts individual clients and the user's clients as a whole. Such information may also be used to support decisions to buy and/or hold a particular asset, link an asset to a particular manager, account, and/or household, for example.

The use of filters and aggregations with regard to tagging may allow the user to perform and create custom reports, as illustrated. Such reports may provide the discrete information desired by the user and may provide information more suitable for client presentations. For example, a custom report may allow for custom labeling of aggregated and/or filtered data and may allow for the production of a report that is not only immediately deliverable to a client, but may allow the custom labeling to be employed as between clients having data similarly disposed. For example, information under "Equity REITs" may be automatically relabeled for reporting as "Real Estate Funds" or "Income," such as per a user-input tag rule for reporting.

In addition to custom tags being translated across the user's clients and/or across a user's user community, the user may incorporate tags created by other users. Such a selection may be automatically available for selection by the present invention and may be presented in a drop down menu, for example, when the user is creating a report or customizing tag descriptions. By allowing for the free-flow of customized tags and reports, the present invention may provide a high degree of contextualization of the information accessible to and entered into the system by and between the users of the system, and with respect to all of an individual user's clients, or all clients, by way of non-limiting example.

This customization may allow for users and clients to more readily discuss the performance of funds, user and client asset allocations and blends, and investment history, for example. Similarly, real-time reports may be easily provided using selectable fields which include user and user community created tags and tag descriptors. Although any known method of GUI information interface may be used, including the herein-discussed pop-ups or drill downs, the present invention also allows for the swapping of data onto the screen asymmetrically, without a pop-up or drill-down screen change, within an existing workspace and/or window to thereby allow the user to more easily add, explore and/or remove data from a given client, for example.

In addition to the communicative features discussed herein, the present invention may also provide a social networking feature, such as a micro-blogging service, for example, which may be associated with specific investments, clients, and/or users, and that may be automatically associated with various tags, and that may allow the push of investment and performance updates through to very specific audiences based either on user preferences and/or user holdings/behavior/goals and the like. In embodiments, any social networking infrastructure may be used, such as, for example, Facebook®, Twitter® or LinkedIn®, for example. The present invention may also control such information by relevance and/or urgency by evaluating the information with regard to the characteristic(s) of the user and/or the attributes of the information.

In the embodiment of the present invention illustrated in FIG. 3B, tagged financial information may be processed through a filter engine and may provide the user with a focused listing of desired news, trends, and or investments. The financial information processed through the filter engine may include, for example, individual stocks which have been tagged by the user. The user may employ a tagging scheme, whether adopted, modified, or created by the user, to differentiate the individual stocks by at least one metric such as, for example, semi-annual return.

For example, a stock within a subset of stocks traded by the user with at least one client may be tagged to denote the user's estimation of the stock's value and potential. For example, the user may tag a stock using a scale such as, "good," "very good," and "excellent." The stocks within the subset, tagged "small cap growth" for the purposes of this example, may further be tagged to indicate the client(s) who hold the stock(s) and the business sector related to the stock, for example. A query run through the filter engine on the user's small cap growth portfolio may produce a report to the user showing the stocks within the user's small cap growth portfolio, such as in a weighted list based on the tagging associated with each stock, the performance of each stock over at least one discrete time period, and the number of clients who hold the individual stock, for example.

Such a report may provide a ranking based on the user-defined tags weighted against the annual return of the stocks, for example. In this way, the user may be able to adjust a particular stock's tag in light of actual performance, and may be able to add at least one tag to one or more the stocks within the small cap growth portfolio, such as to allow those stocks to be further evaluated in relation to one or more other portfolios, for example. The filter engine may also aggregate certain tagged investments and compare them to the performance and/or tagging of other investments to create a risk assessment. For example, a risk valuation report may show that twelve clients have a total of $100,000 invested in a particular stock which is tagged as "very good" but is underperforming in the last quarter. Moreover, a user may create rules that reflect on the types of investment decisions the user may recommend in such circumstances, and consequently may allow for gathering of useful investment information in the context of specific situations based on the combination of tags, asset behavior, and rules.

Similarly, asset types tagged within the system may be compared to one or more clients to assess the riskiness of a particular portfolio. For example, although client A may have the appropriate amount of exposure to equities versus bonds, the combined holdings of clients A, B and C, who in this example are all blood relatives, may be too heavily weighed towards equities, for example. In this way, the user may better understand and visualize the blends of investments held by individual clients and related clients. Similarly, investments held by one or more clients may also be compared against one or more clients of the user and/or of third party users, the perception or marketing of a specific strategy (for instance one employed by a separate account manager), the perception of the underlying securities, and/or an advisor's marketing and/or actual investment work, for example. Thus, the present invention may provide a mechanism to assess client satisfaction and measure an advisor based on goal achievement rather than solely performance, for example.

The present invention may further allow tags to have secondary or hidden meanings through the association of a tag with terms and other descriptors to provide a second layer of information which may be used by the filter engine. For example, a custom tag called "localInv3" may be used to signify an asset which is of a local origin having a risk level of 3 on a user's scale of 1 to 5, with 5 being the most risky. (Of course, risk is subjective, but as can be appreciated by those skilled in the art, a risk of 5 on an investment asset may be a result of the non-secured nature of the investment, for example). The user may associate certain terms with the example tag to provide greater context such as: local, investment, unsecured, >100K, sole proprietorship, 5 years.

The secondary and/or successive layer(s) of tag information may be used by the present invention to provide more comprehensive results to the user and to provide a greater degree of analysis and/or analytic data. For example, a user may wish to view local investments and may request a report based on the term "local" existing in a custom tag. The system may return results associated with tagging that has the term "local" in the tag description and/or the secondary tag layer. Similarly, when looking at client information, the user may filter for high risk investments and may be provided with results for which the only indication of the investment's risk level is within the secondary layer of the associated tag. This may allow a user to more clearly understand the full scope of the investments associated with a particular client, for example.

Tagging within the present invention may also provide for the ability of a user to display strategies and performance for, and/or to manage separately or in the aggregate, such as by asset class or the like, individual accounts, across multi-party accounts, and by other users/individual accounts. For example, and as illustrated in FIG. 3C, a user may tag certain accounts (and the tagging may propagate by default to all of the assets owned or otherwise associated therewith) with a family tag, and may be able to graphically view associations between tagged members. For example, the Riche family may be composed of multiple account holders, some not sharing the same last name or other identifying information. In this case, the user may tag an account with a "Riche" tag to allow for the easy aggregation of family accounts.

Similarly, such a named tag may be useful in tracking referrals. Such a tag may be, for example, "RicheRef" and have a second layer including Riche and referral, for example. In addition, with relationships between clients, asset holdings, and memberships, for example, more readily exposed, a user may offer certain investments and/or services to clients based, in part, on the client's association with related clients and/or client related assets and/or membership, for example. Such tags may be generated in accordance with one or more user-defined rules, as illustrated in FIG. 3, such as wherein typing by the user of 3 letters, such as "ric," will autopopulate a tag of a group or individual client's last name, such as a tag starting with "Riche". Thereafter, in the above example, once the last name autopopulates by rule, the typing of 2 letters, such as "re," may autopopluate a referral tag, such as the afore-discussed "RicheRef."

In this way, the present invention may allow a user to quickly identify not just which clients and prospective clients are related, but what the "full picture" of debt, investments, net worth and insurance, for example, might be as associated with those related members. For example, calling up the Riche family may allow the user to see, for example, that given the net worth of the group, a subset of the related clients has inadequate life insurance coverage. Similarly, a single client within the larger group may have significant debt which may impact the investment strategies of one or more of the associated group. Furthermore, a user may understand the mechanism by which a client arrived at the user's firm, for example, and the client's predilections with respect to certain products. For example, there may be reasons the client doesn't have life insurance, which, de facto, makes the client an unattractive target for a life insurance pitch in spite of his/her apparent need.

Tags may also be used to denote user affiliations. For example, a user associated with the system may be employed or otherwise affiliated with a large investment firm, such as, for example, Fidelity. This information, which may be gathered upon registration with the system, may allow other users to not only see certain investments and other interactions made by the Fidelity user, but also to be informed regarding with whom certain users are affiliated. Thus, users may follow and research the investment activities and tagging done by other users and enable, for example, permission-based communication, both private and public, and, thus, monetize the information contained within the system.

The present invention may also allow users to see, in real-time, the investment recommendations made by any preferably anonymized user or users of the system, and may graphically or similarly provide trending information in a defined periodic period to each user. Such tracking of user information may allow a user to better anticipate swings in various investment types and specific markets, and may alert a user to trends not otherwise immediately obvious to the user. For example, a subset of users in Colorado may be investing in an unusual amount of real estate holdings in a specific location, such as, for example, Aspen. Although there may be various reasons why a spike in localized investments would be occurring, the fact that the spike in investments is occurring is important and valuable information to the user. As will be appreciated by those skilled in the art, this real-time view of investment activities applies to all investment types described herein, and may be used by a user to compare various investments and investment strategies being deployed by users of the system. Similarly, those skilled in the art will appreciate that such information, such as in relation to specific investment funds, may be highly valuable to marketers, such as marketers of those specific funds or competitive funds. By way of further example, such information may assist marketers in better understanding value swings and how to sell into them—outside of an investment context—and/or assist corporations in better understanding the trajectory of critical input prices, for example.

Additionally, the present invention may provide an aggregated view along with client information. For example, when viewing a client's investment portfolio, a tag may be represented along with an indicator of the number of other clients similarly situated. This information, along with anonymous forms of client information, may be shared between users. The aggregation and sharing of client-based analytical data may provide the user with a better and real time understanding of market forces and client/investor perceptions and strategies. Similarly, in accordance with the discussion herein, such data may be defined in a tag, and as a grouping of tags (herein defined to be a tag cloud).

The present invention may also provide mapping and/or linking based on relationships between clients and/or the investments and information associated therewith, as discussed above with respect to FIG. 3C. Such relationship mapping may be done graphically and may include such tools as heat mapping, bivariate plots and isotypes, tag clouds and node charts, for example. Investments such as cash flows, for example, may be viewed in a heat map format and may thus take into account clients and the relationships between the client and client demographics and financial conditions, for example, and this may additionally allow to be shown as the movement of cash. Further, this mapping may indicate factors in the aggregate, such as demographics, overall assets, or the like, that drive cash flow directions, by way of non-limiting example.

In an embodiment of the present invention, the data collected for each user and client, and the tagging associated with each, may be used to provide targeted advertising and/or offerings not otherwise present or monetized by the user and/or client. Such targeting may be a result of the comparison process discussed above and may focus on users having a particular third party affiliation. For example, a third party service offer or may wish to advertise a specific investment opportunity to independent users who represent at least a portion of clients who are qualified investors of a certain net worth. For example, as illustrated in FIG. 3C, the targeting engine 341 may serve a queued advertisement for private bank services if it is determined that the user does not use private bank services, or uses such services at a lower frequency than similarly-situated users. That is, the aggregation and characterization of user accounts in the present invention allows for the establishment of user preferences and omissions, individually and in the aggregate, such as heavy foreign fund focus or lack of private bank use, and product and service offerings may be targeted thereby.

Similarly, an advertisement may be directed to the qualified investor and/or individual households (representing more than one related client). In this way, a household, client, or asset (and the associated users and/or clients) may be targeted for certain services and/or opportunities, such as the use of a small independent bank for underwriting and securities distribution services (which may be offered less expensively and more effectively than traditional banks). The targeting engine 341 may also factor user and client account types, account volume, areas of expertise, investment leanings based on analysis of posted investments, and the like. More specifically, clients, and particularly client accounts, may be evaluated for targeted advertising based on occupation, risk profile, current investment strategy, net worth, and/or behaviors, such as the average time which elapses between a user proposal and money placement, for example.

The targeting engine may also provide opportunities to the user for the offering of additional services to existing clients and to prospective clients entered into the system. Prospective clients may be entered by the user and/or may be automatically imported into the system by utilizing web-crawlers and publically available financial information, such as land transactions, estate transfers and government filings, for example.

In an embodiment of the present invention, filter engine 342, discussed herein above, may be employed to compare certain user and client investment information to the performance of other actual or possible investments, portfolios and/or aggregations. Differences in performance, and more specifically, under- or over-performance, may be highlighted to the user, the client, or both, and may be accompanied by data regarding at least one alternative investment, such as targeting through the targeting engine 341. Additionally, the filtering engine 342 may incorporate single account and aggregated account information from one or more clients and may limit optimization by investment type, risk level of the current investment, risk tolerance of the client, and or geography. Further, advisors may make use of data provided by the filtering or targeting engine as they see fit.

For example, the filtering engine 342 may monitor the performance of Fidelity's Aggregate Bond Fund and may continuously, periodically, or upon request compare its performance against a different bond fund which may be available to or held by at least one client. If the daily or quarterly return on the Fidelity fund outpaces the held fund by more than a predetermined level, such as, for example, ten percent (10%), the targeting engine 341 may then alert the user, for example, of the opportunity for the user to evaluate the offered Fidelity fund and the current bond fund. The present invention may also allow performance filtering for investment offers to be controlled by user preferences. For example, a 10% lag may not be an arbitrary value but a value set by the user through his use of the system or by a marketer through their use of the system (or, preferably, by both).

In an embodiment of the present invention, clients, investments, prospective clients, contacts, meeting and other meaningful information of a user may be maintained and organized, such as through the use of database 380 (see FIG. 3B) in association with any of a plurality of screens of user interface 420 (See FIGS. 6A-E, for example) to provide greater efficiency and productivity to the user. In embodiments, the present invention may allow for the inputting of client specific information which may include calendaring information with a custom activity description, for example. This information, while useful for the planning of and executing by the user, may be more meaningful when reviewed as a client history of interaction, for example.

Further, the present invention may provide a log of past events associated with each client and/or prospective client of the user for ease of reference by the user. This may allow the user to optimize the time spent with each contact and may allow the user to quickly reference and discuss past meetings with a contact. The present invention may also allow a user to record and track gifts given to various clients, holidays celebrated, including birthdays and anniversary, for example, and may allow the user to summarize any and all expenses allocated to each client for tax reporting purposes. Further, in combination with at least one record created by tagging, which may be time-specific, recorded events and/or transactions may be associated with the at least one record. Such information may allow a user to understand the motivation for the events and/or transactions, and may allow for the creation of user-side filters for new products/services as well as marketer side analysis/advertising.

The present invention may also allow for the tracking of third party account relations, such as debt issuances and repayment obligations of clients, and may provide a single source page to allow for ready access by a user to such data. For example, a client's investment portfolio, market value and tax consequence status, and the like may be displayed in a single window within the GUI of the present invention. Multiple accounts held by the same client or related clients may be shown in the aggregate or viewed separately by clicking, or drilling down, on individual client(s) or account identifiers.

In embodiments, the performance and flow-through of capital may be viewed by clicking and drilling down through a particular client account. Account particulars, including fees collected and/or charged by the user, may be reflected by account, for example. Thus, an all-inclusive view of certain information may be presented, including upcoming calendared events, recently added accounts, leads to potential clients not yet acted upon, and a list of potential clients with information regarding possible investment values and/or an estimated time in which they will invest in a particular asset.

In an embodiment of the present invention, users and third party providers of information may be assessed, rated, and/or certified to indicate a level of expertise or trust established within the present invention and the financial community as a whole. In an aspect of the present invention, all users and third party providers may be subject to rating by clients and/or users. The rating system may based on several parameters which may include, for example, years of experience, promptness of support/responsiveness to inquiry, past investment performance, rating by third parties, accredited association memberships, affiliations, and investment strategy, for example. Each factor may, but need not, be weighted equally. For example, a rating by third parties may be weighted to count the most. In an embodiment of the present invention, rating and tagging may be merged and weightings developed based on user-defined preferences and/or the weight of each merged item (e.g., an item has greater "weight" if the item, such as a tag versus a rating, for example, has a greater number of factors associated therewith).

For example, a user within the system may have his investment strategy relied upon by 20% of all users but may have a very low rating by his peers. This would weigh down the rating value that could be achieved by the user and may prevent the user from being certified within the system, for example. In an embodiment of the present invention, a total rating value of 50 may be available with no more than 20 points attributable to any one attribute described above. Conversely, a negative rating of no more than −5 may be attributable to any one attribute by each person able to perform a rating. A rating may also be an averaging of scores received from those who provide a rating, for example. Further, peer ratings and client ratings may be independently provided, such as in an embodiment in which an advisor seeks a rating to work with other advisors. As discussed herein, users of the system may be authorized to use the system and may be independently verified and/or investigated to ensure the user's identity and/or credentials.

Ratings may also include social media input and, more specifically, may be associated with social media mentions of the rated individual. For example, the present invention may offer blogging capabilities, as discussed above, which posts may be associated with a rated individual. In this way, comments made about certain individuals may be seen by others who may not otherwise access or participate directly in the social feature of the present invention, such as wherein actions outside the present invention may contribute to the aforementioned rating within the present invention. Further, the present invention may periodically perform a web crawl to capture any third party comments made about a rated individual. As would be appreciated by those skilled in the art, the filter of such information may be made through a correlation of site relevance and keywords, for example, and may be further filtered by a gatekeeper associated with the GUI of the present invention.

In an embodiment of the present invention, a certification may be provided to users and third parties who achieve and maintain a certain rating level and/or are able to document certain professional claims, such as, for example, certain affiliations and/or licenses obtained in regards to the financial industry. A certification may allow users of the system to very readily trust the advice, movements and service offerings made by certified individuals, for example. Certification may also include that sharing of the information underlying the certification to be shared with third parties, such as government agencies. For example, the Securities and Exchange Commission may be given access to certified individuals, such as users and clients, via GUI 420 and thus may also have access to the positive and negative feedback, including any social media entries, made in relation to the certified individual.

In an embodiment of the present invention, a rating and/or certification along with other pertinent information may be associated with a virtual business card which may be shared between participants in the system. Such cards may be passed between system participants and may be updated in real time to reflect current ratings and/or comments made relating to the card holder. Thus, users and clients may rely on the information present in such cards when deciding upon whether to rely on or engage the services of the card holder.

As such, the herein disclosed systems and methods provide an enabling technology for advisors and like professionals in industries such as financial services. As discussed, the present invention provides a data aggregator and data store, and a plurality of engines for accessing, manipulating, and sharing such data. The ability to access, manipulate and share the data allows for advisors to execute decisions based upon the data, such as recommendations, processes, or acquisitions based on the data, by way of non-limiting example. Further, such data enables clients to obtain information from or about users more expediently, and further enables clients to gain the benefits of data accumulated with regard to particular users and classes of users, by way of non-limiting example.

Figure 4A:
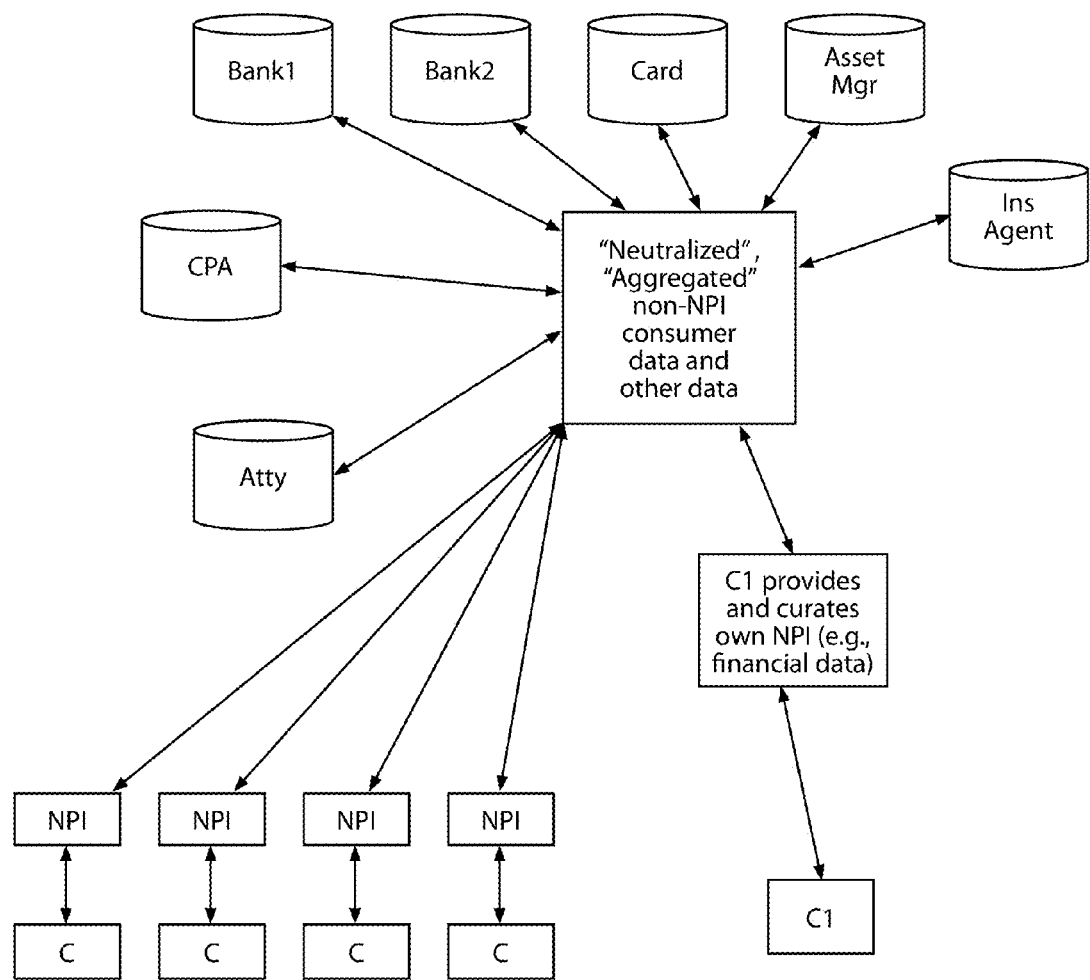
FIGS. 4A and 4B illustrate exemplary arrangements of data and permissions in accordance with the herein described systems and methods.

FIG. 4A illustrates exemplary data flows and access involving NPI in accordance with the herein disclosed systems and methods. As shown, in an exemplary operation NPI may be provided by clients, for example, using a web-based client interface. The clients may also be responsible for curating their own respective NPI, that is, ensuring its ongoing accuracy, completeness, and/or control over its uses. In addition to maintaining the data including the NPI, the system preferably removes the NPI to create a "neutralized" copy of the NPI-based data that does not include, associate with, or link to any information that identifies the subject individuals directly. Thereby, even though information identifying individuals may be publicly available, it is not directly associated with detailed individual information in a way that abrogates the individual's privacy. As shown in FIG. 4A, only the neutralized information may be available to system users, or to particular subsets of users such as financial product generators like banks and insurance companies. However, in addition to accessing neutral system data, such parties may provide additional neutral data of their own for storage on the system, for their own use or optionally for the use of other users as well. Conversely, some users such as retailers like asset managers and insurance agents may be in possession of their clients' NPI. They may provide such NPI to the system, which may be curated by themselves, or their respective clients, or both, and/or neutralized by the system for access to other users as well.

Figure 4B:
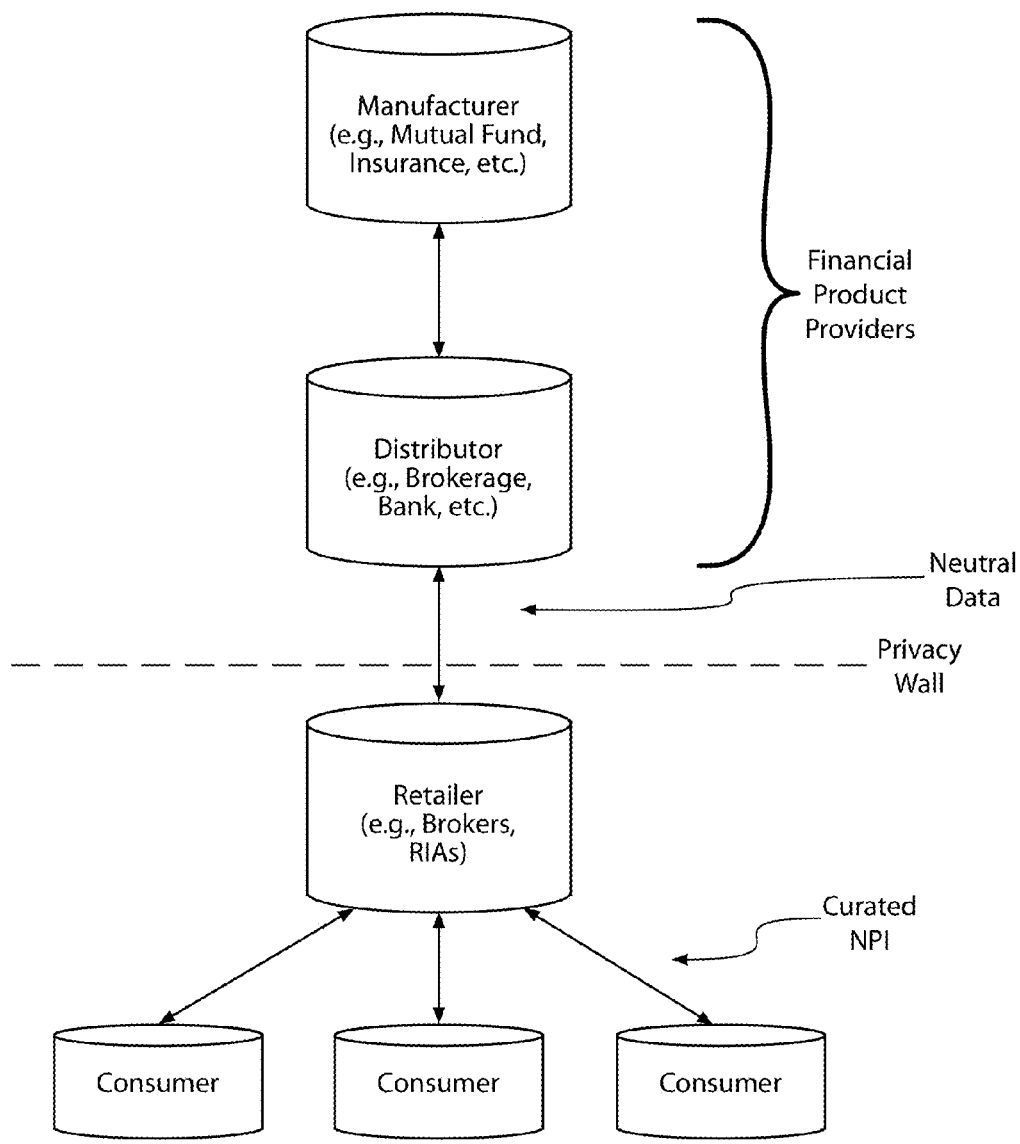

FIG. 4B more clearly illustrates different levels of users of the system and the character of the data they may be permitted access to. As shown, a "privacy wall" separates the data that contains NPI from the data that does not. Parties that can provide, access, and/or curate the NPI include the consumers of retail products and services and their advisors such as brokers, registered investment advisors (RIA), and similar retailers. After the data is neutralized, the resulting neutral data may be accessible to brokerages, banks, and other distributors of financial products and services, as well as to mutual funds, insurance companies, and other manufacturers of financial products.

The integration of data from all levels of the product/service supply chain allows all participants in the chain to benefit from the neutral data in a way not previously possible. Any or all participants at any or every level of the supply chain can read, manipulate, and contribute to the neutral data. Thereby, each participant not only gains the benefit of his/her own perspective and analysis, but can communicate with other users such as outside partners directly with regard to actual empirical client data, but without violating the privacy of the clients. In this way, the participants can safely signal to others the implications gleaned or teased from the neutral data by their analyses.

In an exemplary operation, when communicating downstream in the chain of data, participants higher up the channel can input their information and their targeting criteria to deliver finely honed targeted information, such as for use in proposals and the like, at a level that in the prior art would require the sharing of NPI, in violation of statutory, regulatory, and ethical requirements promulgated by self-regulatory organizations (SROs). In the case a particular user's data requirements are not met by the system's existing data fields, the system may be extended by setting up additional data fields and populating those fields by entering therein new data and/or coupling the system to new automated data feeds, such as RSS feeds, real-time market feeds, or any other regularly available source of data. In this way, arbitrarily detailed micro views on any data may be used. In a currently preferred exemplary embodiment, financial data such as market data may be collected by the system, including position and transaction level data that, unabstracted, would necessarily include NPI. Moreover, a tremendous amount of such data is often redundantly collected and maintained by numerous parties, even within organizations. This can cause both lost time/money and less stable analyses. However, the disclosed system can be configured to remove the NPI to form neutral data that can be used, for example, to create artificial, blind, anonymous groupings of accounts, positions, people, or any other parameter to suit any number of analysts' needs. Having users at all levels of the distribution channel depositing and accessing data from the same database repository can allow macro level intelligence to be derived from micro level events and behaviors that may be traced throughout the distribution channel.

Figure 5:
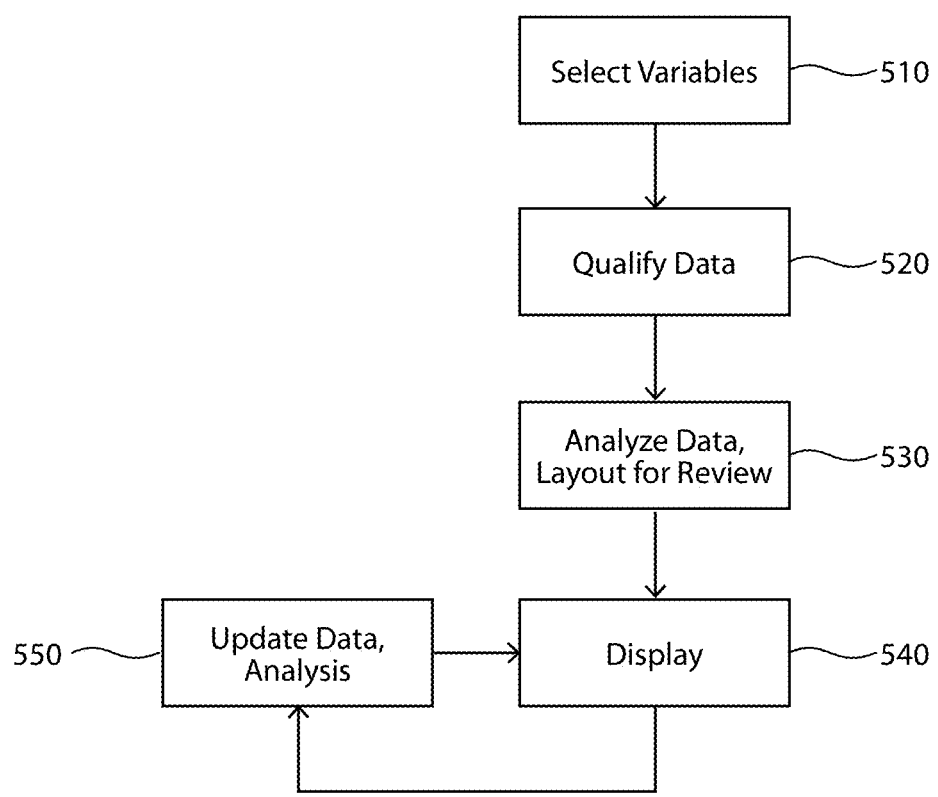
FIG. 5 is an illustration of data flow in accordance with the herein described systems and methods.

FIG. 5 is a block diagram illustrating exemplary neutral data flows that may be employed by users of the system. In general, a user such as an advisor would select variables, 510, that are available in the system to choose from, such as the variables listed in FIGS. 7-8. The data pertaining to those variables are then qualified, 520, such as by applying filters to ensure only desired data is included in subsequent steps. After qualification, the data are operated upon, 530, for example, by performing calculations on the data such as aggregating, statistically analyzing, combining with other data, etc. The system may be used to manually refine the desired data manipulations which, when refined, can be set up to be executed, either programmatically and automatically in accordance with parameters selected or entered by the user, or in response to a discrete user request. The data and/or the results of the refined data manipulations may then be charted, graphed, and arranged in any desired manner and combination for viewing by the user. Illustrative exemplary chart and graph elements are shown in FIGS. 6B-6E, but the invention is not limited to those few examples. Rather, the user may select from a wide range of possible predefined elements, or may configure new elements.

The system then provides for the display of the data, the results of analysis of the data, and/or the charts and graphs that were set up and arranged to show the results, 540. For example, the system may serve a web page to a web browser of the user running on a user computer. An illustrative arrangement of exemplary chart and graph elements is shown in FIG. 6A, but the invention is not limited to that arrangement. Rather, the user may select from a wide range of predefined arrangements, or may configure new arrangements.

Thereafter, the system can update the data and the analysis, 550, and display the updated results. The update and redisplay may occur continuously, or periodically, or in response to a user request, in accordance with user defined preferences. In embodiments, at least a portion of the data can be automatically updated, such as by obtaining one or more live data feeds such as stock market activity, and/or crawling the Internet, and/or receiving additional and updated information input by clients, for example.

Figure 9:
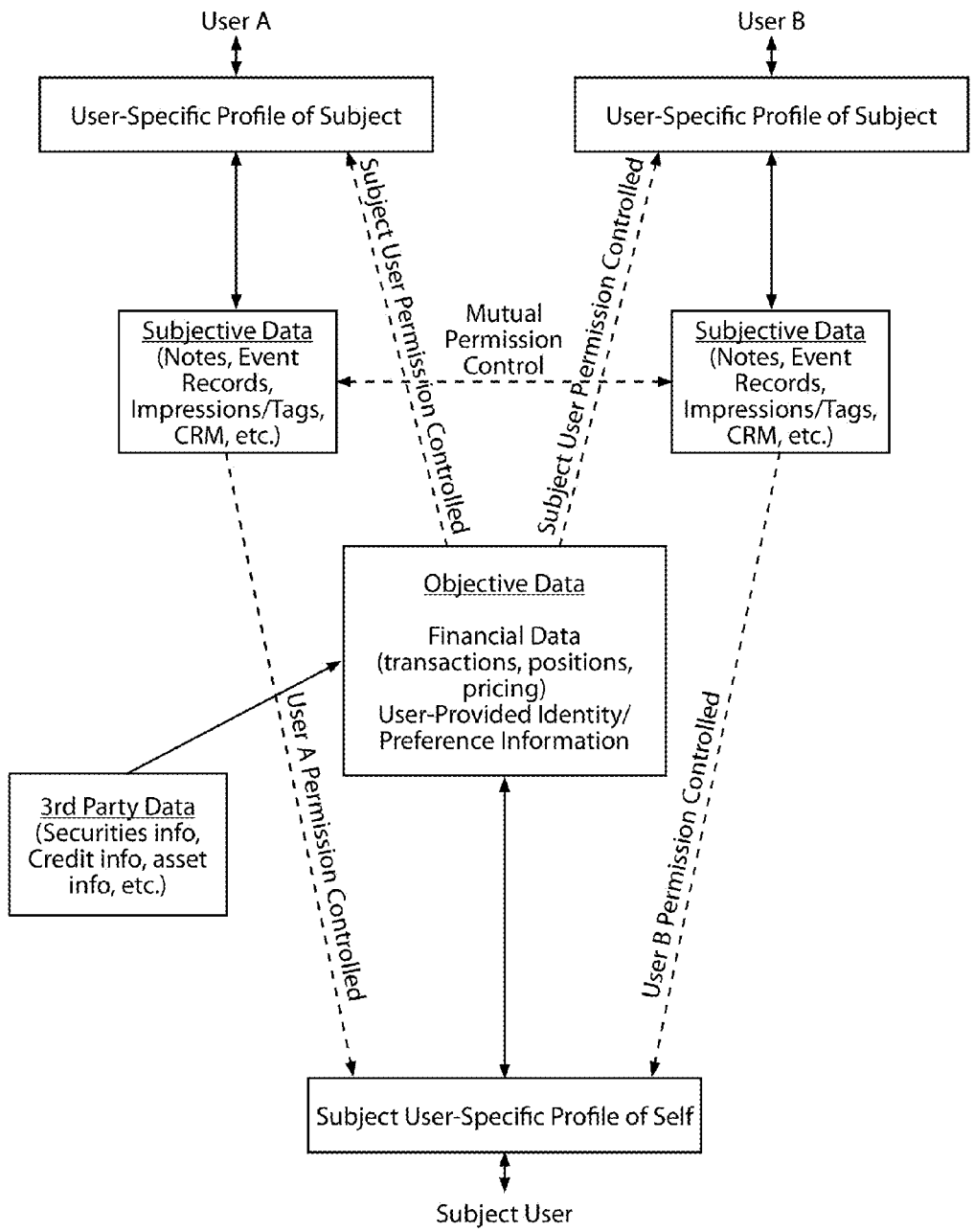
FIG. 9 is an illustration of exemplary data flow and access in accordance with the herein described systems and methods.

As illustrated in FIG. 9, users of the present invention and/or their clients may enter data, such as subjective data, to form the basis of at least one subject profile. Users and/or their clients may, if sufficient permissions are provided, select objective data collected and aggregated by the present invention to be associated with at least one profile. Similarly, a user may enter information related to her own profile and may choose who has access to any user created profile. Thus, other users may contribute data related to at least one profile and/or communicate directly with a user in a way that does not accrue to the profile. Similarly, a user or client that views a created profile, if sufficient permission is provided, may be permitted or required to curate non-public personal information (NPI), and/or maintain a separate subjective version of that profile to allow that user to compare, edit and/or curate NPI.

In embodiments of the present invention, subjective information may be compared to objective information collected by the present invention. Such objective information may include information entered by a user, which may be verified by a third party, and third party information, such as, general market and securities data, transactions, position histories, security characteristics, and/or client specific data, such as a credit rating, gathered from a third party, such as, for example, Experian. The objective data may be free from substantive alteration, even by the subject user, but may be controlled by a creating user such that the user may control access to the information. Thus, a user may make a determination whether or not certain ratings, tags, and/or other subjective information are accurate.

In an embodiment of the present invention, other users may contribute to data pertaining to a subject's profile, and/or communicate directly with the subject in a way that does not accrue to the profile. The subject may curate his or her profile, for example, by controlling permissions that dictate who can see what on his/her profile. This may allow for a simple and linear control and effect. For example, a service provision-focused network may require a significant degree of nuance. Every user that views a profile may maintain a subjective version of that profile in order to make it fully useful for the user's purposes. Preferably, the user can control permissions that allow or disallow the sharing or hiding of personal contributions to the subjective profile version, for example, with the subject of the profile or other users. In this scenario, certain data points, such as characterizations or ratings of a subject, that one user perceives to be accurate may be perceived as totally inaccurate by another user with a different perspective. On the other hand, to be fully useful, some important, objective data should reside in the profile free from alteration, in some cases even by the subject of the profile who is responsible for curating its data, save for the subject's ability to control who can or cannot see said information.

In an embodiment of the present invention, a plurality of users may maintain respective discrete versions of subjective data keyed to a centralized objective data repository. This may allow users to selectively share subjective data scalably by maintaining the integrity of the keys linking to the data while maintaining a unique perspective on the subject of that data that the users establish.

For example, the present invention may allow two users, such as two financial advisors, to both serve one client. The client may use one advisor to make risky investments and the other to make more conservative investments. In one view, the client may possess a moderate risk profile. However, the risky investment advisor may aggregate subjective data such that the client is viewed to be quite aggressive, while the advisor with the more conservative investment strategy may have the opposite view given that advisor's subjective profile. The client may then hire a third advisor to oversee the two original advisors and may request that two or all three communicate fully.

On a traditional network, such as CRM, for example, or a traditional social network data structure, the overlaying and sharing notes, impressions, and the like that are keyed to specific client transactions, for example, are extremely complicated because there may be at least three non-connected and/or inter-related copies of all the data. For example, each service provider may maintain a separate database, whereas traditional social networking data models allocate to each user one profile, sharing only specific pieces of such a profile with other users.

The herein disclosed systems and methods may allow for the comparative integration of client information and may facilitate the sharing of at least some portion of client-specific and non-specific information controlled by at least two users. As discussed above, the client-related information that may be shared may include client-related party information. For example, the risky investment advisor in the current example may be related to at least one other user, such as an estates and trust attorney, for example, who has entered sharable information related to the client, such as, for example, trust information about a relative of the user. Similarly, such information may be shared across users and may include a plurality of such interconnections which may be controlled by the user.

In embodiments, data that is entered into the system by a user, or that is obtained by the system, such as by crawling the Internet, is scrubbed of non-public personal information (NPI) and rendered in neutral format. The neutral formatted data can then be reprocessed and reinterpreted flexibly in any manner without divulging any NPI. Thereby, a calculation engine or the like can perform the recalculation of performance on a very limited sliver of data very far into the past without affecting any untouched data.

This may be important when utilizing the data mining opportunities of financial or other data that may shift and alter idiosyncratically over time. For example, even historical data may be subject to review and revision, such as due to tax lot confusion, or the addition of a new twitter stream that contains historical information.

Figure 10:
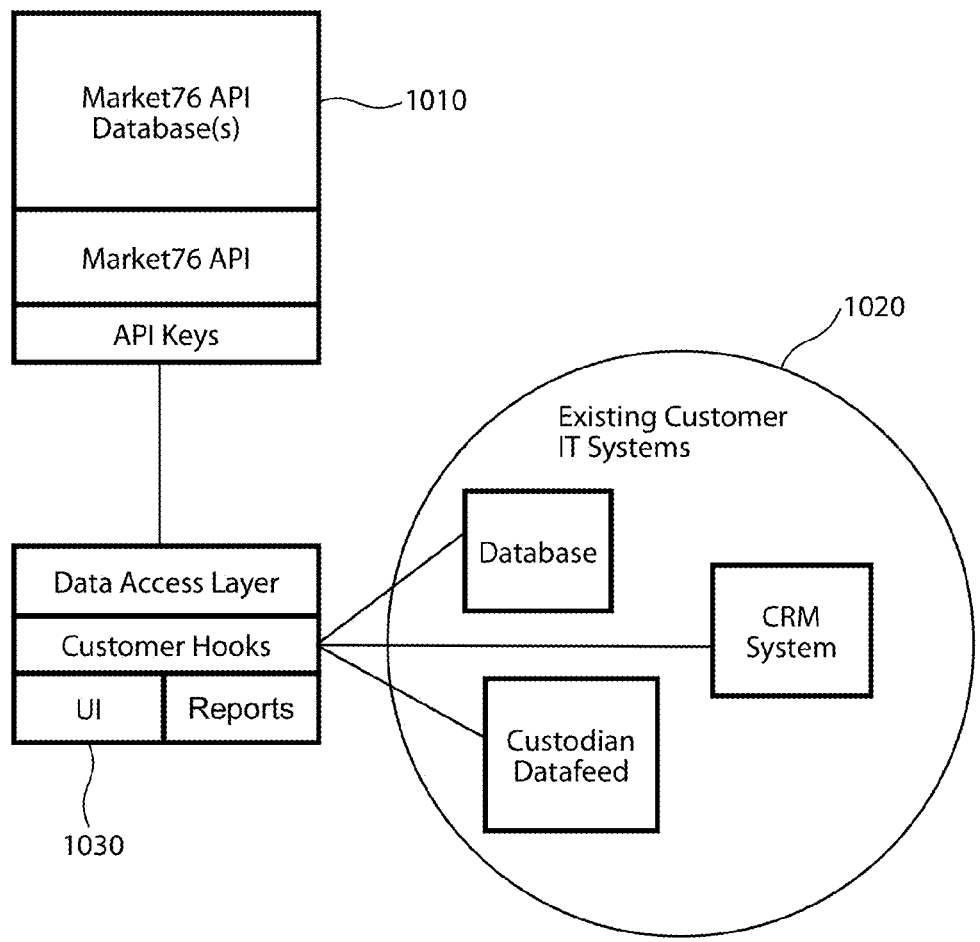
FIG. 10 is a simplified block diagram of an arrangement of system elements in accordance with the herein described systems and methods.

FIG. 10 shows an exemplary arrangement of elements of an exemplary system for use in entering client data into the system. As shown, client data in the system is stored in one or more databases, 1010. Data is input using an application programming interface (API) that may employ API keys to properly place and associate data entering the system. The data may be entered into the system by programmatically interfacing with existing customer IT systems, 1020, or manually by clients and users, 1030.

If programmatically, 1020, data may be input into the system directly from customer IT systems, such as databases, custodian datafeeds, and/or client relationship management (CRM) systems. If manually, data may be input through the use of a user interface (UI), such as a web based interface or the like. In embodiments, a data access layer that interfaces with the API may be accessed through customer hooks, for example. Likewise, once stored, data may be accessed and retrieved from the system through the data access layer by using the API to utilize the display capabilities described previously, or any other known report generating capability.

The present invention may also utilize publicly available information about advisors, such as, for example, market metrics, and cross reference it the local database of the present invention. Various rules and other criteria may be applied to gathered data and my create information related to client holdings, client distributions, and behaviors of a particular advisor, investor, financial services firm, and geography of investors, for example.

Figure 11:
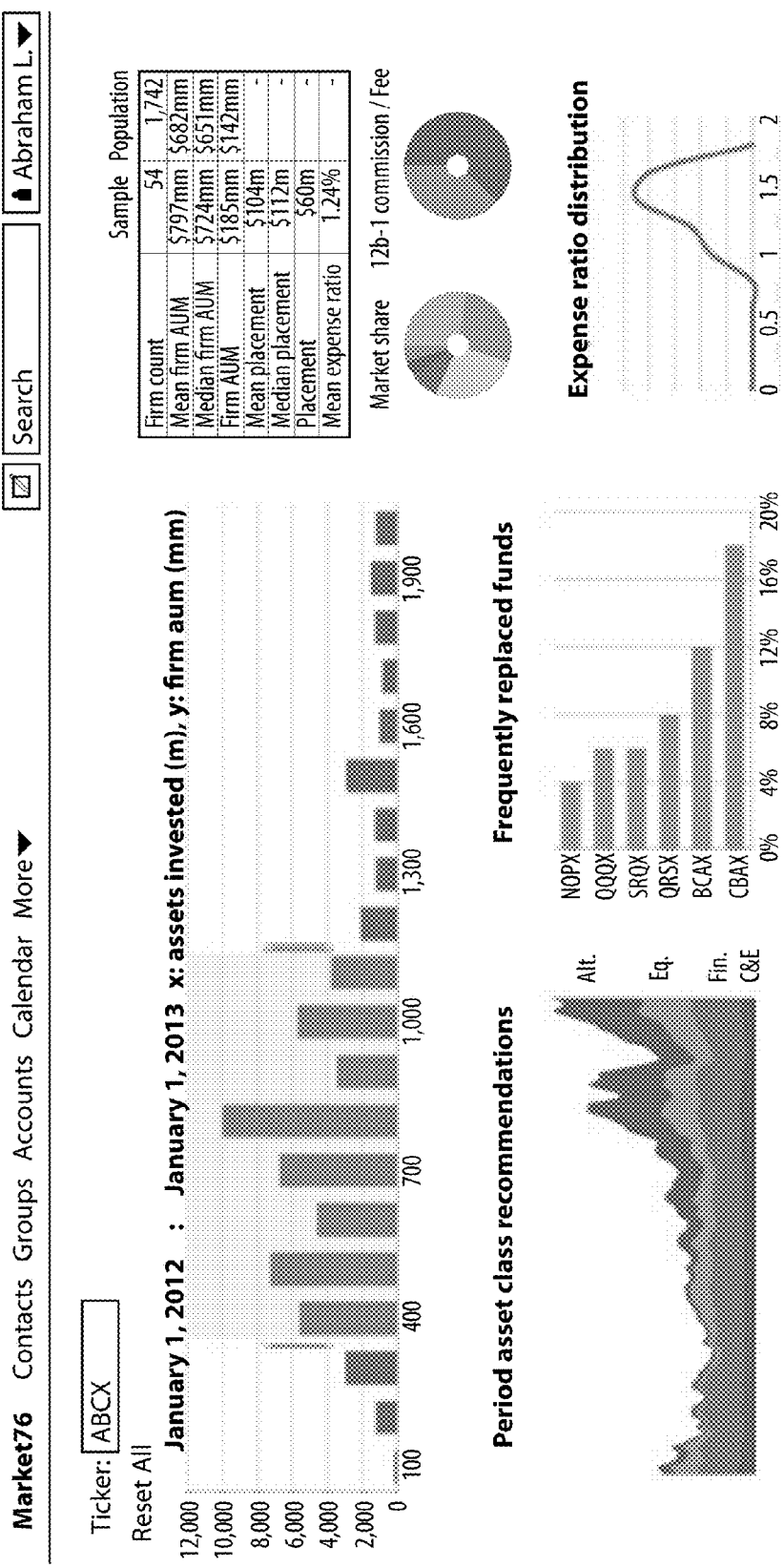
FIG. 11 is an illustration of exemplary data flow and access in accordance with the herein described systems and methods.

As illustrated in FIG. 11, the present invention may calculate market opportunity associated with a specific fund or product in the financial marketplace. The present invention may allow users to project, to a high, measurable level of statistical certainty (confidence intervals) the likely fees paid by different demographics of purchasers of a product, the other holdings and recent recommendations, for example.

Figure 12:
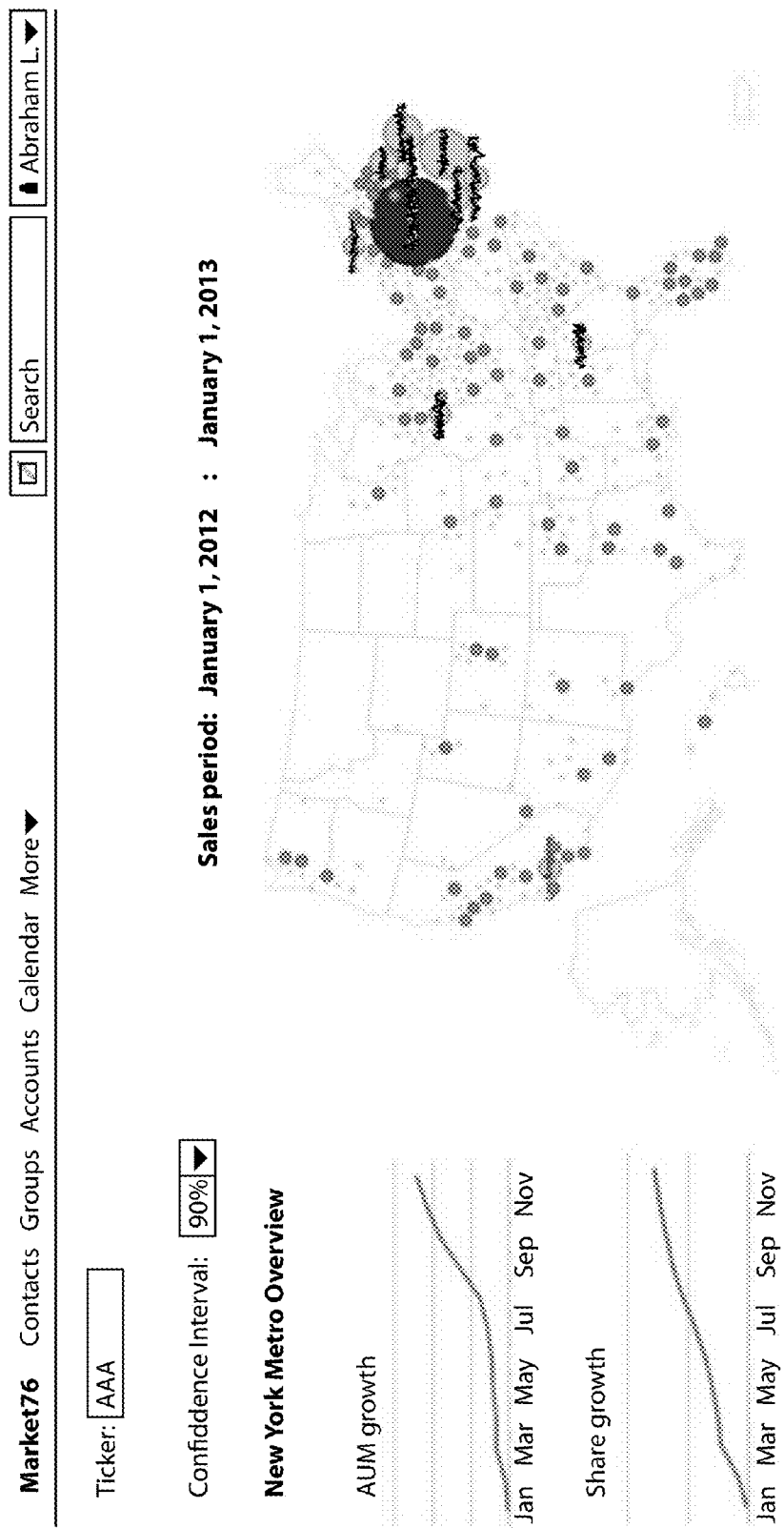
FIG. 12 is an illustration of exemplary data flow and access in accordance with the herein described systems and methods.
Figure 13:
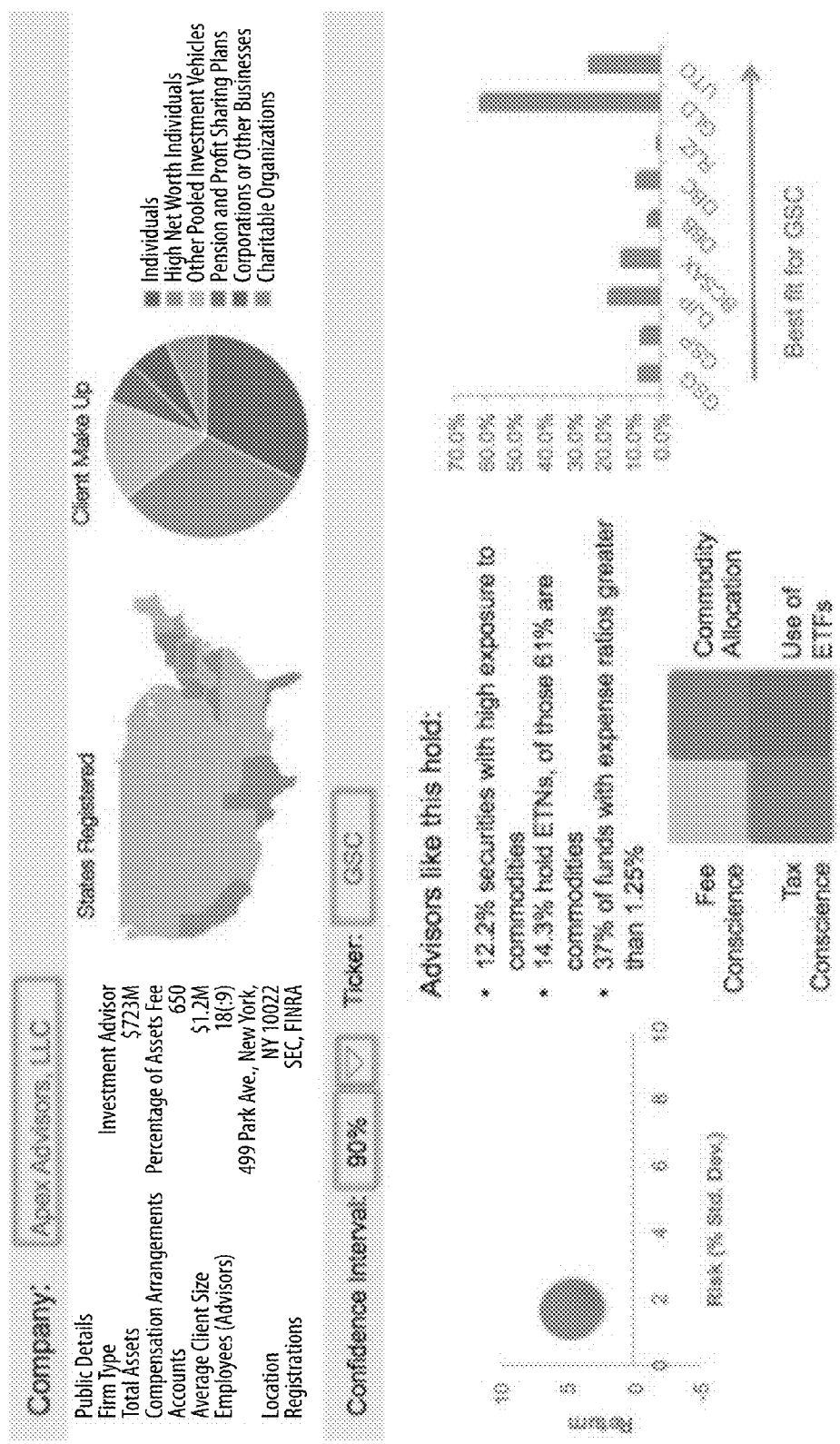
FIG. 13 is an illustration of exemplary data flow and access in accordance with the herein described systems and methods.

As illustrated in FIG. 12, the present invention may monitor the sales of exchange or privately traded products—which may allow users to project to a high degree of certainty sales force efficiency where it is currently impossible (notably with ETF's). Similarly, as illustrated in FIG. 13, the present invention may process publicly available information about an advisor to project likely buying habits, holdings, and predilections.

Those of skill in the art will appreciate that the herein described systems and methods are susceptible to various modifications and alternative constructions. There is no intention to limit the scope of the invention to the specific constructions described herein. Rather, the herein described systems and methods are intended to cover all modifications, alternative constructions, and equivalents falling within the scope and spirit of the invention and its equivalents.

APPENDIX TO THE SPECIFICATION

We can now take publicly available info about advisors, like the stuff on the sec and finra websites (or the stuff that market metrics gathers. Or whatever), cross reference it against our hyper detailed database, and then create hyper detailed estimations of the holdings, client distributions, and behaviors of a particular advisor, investor, financial services firm, geography of inventors, etc.

Slide 1 uses sampling on our system to size up the market opportunity associated with a specific fund or product in the financial marketplace. It allows users to project, to a high, measurable level of statistical certainty (confidence intervals) the likely fees paid by different demographics of purchasers of a product, the other holdings and recent recommendations, etc.

Slide 2 uses the same process to monitor the sales of exchange or privately traded products—allows users to project to a high degree of certainty sales efficiency where it is currently impossible (notably with ETF's)

Slide 3 uses the same process to take publicly available info about an advisor to project likely buying habits, holdings, and predilections.

What is claimed is:

1. A computer-based system to facilitate providing advisory services to clients, comprising:
    a server computer having a tangible computing processor, the processor in data communication with a non-transitory computer memory that stores instructions which, when executed on the processor, implement:
        a data accumulation engine operable to accept user information of at least one user, client information of a plurality of clients of the user, and a plurality of user-defined tags, the data accumulation engine operable to accumulate data pertaining to the user's clients in accordance with the tags;
        a filtering engine operable to filter the data; and
        a services engine for use in providing at least one service targeted to at least one client based on the filtered data;
    the server computer including a network interface in data communication with a network communicatively coupled to a user display device operable to present the filtered data;
    wherein the server computer further implements a data neutralizing engine for removing non-public personal information (NPI) from the accumulated data; and
    wherein the server computer further implements a calculation engine for performing operations on the neutralized data and providing for the display of the results.

2. The system of claim 1, wherein the tags comprise at least one asset indicator.

3. The system of claim 2, wherein the asset indicator(s) comprise at least one asset class indicator.

4. The system of claim 1, wherein the tags comprise at least one client indicator.

5. The system of claim 1, wherein the data accumulation engine continuously accumulates data.

6. The system of claim 1, wherein the display is updated programmatically.

7. The system of claim 1, wherein the display is updated in response to a user request.

8. The system of claim 1, wherein the services engine is operable to programmatically provide the at least one service targeted to at least one client based on the filtered data.

9. A method of facilitating providing advisory services to clients, comprising:

accepting, by a data accumulation engine implemented by a server computer having a tangible computing processor, the processor in data communication with a non-transitory computer memory storing instructions executable on the processor, user information of at least one user, client information of a plurality of clients of the user, and a plurality of user-defined tags, the data accumulation engine operable to accumulate data pertaining to the user's clients in accordance with the tags;

filtering the accumulated data by a filtering engine implemented by the server computer; and providing at least one service targeted to at least one client based on the filtered data using a services engine implemented by the server computer;

neutralizing the accumulated data by removing therefrom non-public personal information (NPI) with a data neutralizing engine implemented by the server computer; and performing operations on the neutralized data and providing for the display of the results using a calculation engine implemented by the server computer;

the server computer including a network interface in data communication with a network communicatively coupled to a user display device operable to present the filtered data.

10. The method of claim 9, wherein the tags comprise at least one asset indicator.

11. The method of claim 10, wherein the asset indicator(s) comprise at least one asset class indicator.

12. The method of claim 9, wherein the tags comprise at least one client indicator.

13. The method of claim 9, wherein the data accumulation engine continuously accumulates data.

14. The method of claim 9, wherein the display is updated programmatically.

15. The method of claim 9, wherein the display is updated in response to a user request.

16. The method of claim 9, wherein the services engine is operable to programmatically provide the at least one service targeted to at least one client based on the filtered data.

* * * * *